(12) United States Patent
Snyder

(10) Patent No.: US 9,359,882 B2
(45) Date of Patent: *Jun. 7, 2016

(54) MONITOR AND CONTROL OF DIRECTIONAL DRILLING OPERATIONS AND SIMULATIONS

(71) Applicant: Halliburton Energy Services, Inc., Houston, TX (US)

(72) Inventor: John Kenneth Snyder, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 470 days.

This patent is subject to a terminal disclaimer.

(21) Appl. No.: 13/799,147

(22) Filed: Mar. 13, 2013

(65) Prior Publication Data

US 2013/0186687 A1 Jul. 25, 2013

Related U.S. Application Data

(63) Continuation-in-part of application No. 12/442,637, filed as application No. PCT/US2007/020867 on Sep. 27, 2007, now Pat. No. 9,103,195.

(60) Provisional application No. 60/827,209, filed on Sep. 27, 2006.

(51) Int. Cl.
*E21B 44/00* (2006.01)
*E21B 47/00* (2012.01)
(Continued)

(52) U.S. Cl.
CPC . *E21B 44/00* (2013.01); *E21B 7/04* (2013.01); *E21B 47/00* (2013.01); *G09B 7/02* (2013.01); *G09B 9/00* (2013.01)

(58) Field of Classification Search
CPC .............................. E21B 47/00; E21B 47/024
See application file for complete search history.

(56) References Cited

U.S. PATENT DOCUMENTS

| 6,233,524 B1 | 5/2001 | Harrell et al. |
| 6,408,953 B1 | 6/2002 | Goldman et al. |

(Continued)

FOREIGN PATENT DOCUMENTS

| GB | 2378017 A | 1/2003 |
| GB | 2457604 B | 11/2011 |

(Continued)

OTHER PUBLICATIONS

"U.S. Appl. No. 12/442,637, Final Office Action mailed Sep. 25, 2012", 17 pgs.

(Continued)

*Primary Examiner* — Robert E Fuller
(74) *Attorney, Agent, or Firm* — Schwegman Lundberg & Woessner, P.A.; Alan Bryson

(57) ABSTRACT

Various embodiments include apparatus and methods that use hand mobile communications device with respect to a drilling operation at a drilling site. Data with respect to one or more sensors downhole at a drilling site can be wirelessly received in the hand mobile communications device. Representations of the received data can be displayed on a graphical user interface screen of the hand mobile communications device. The representations can include displaying the data in a graphical representation, a numerical representation, or a graphical and numerical representation on the graphical user interface screen. Additional apparatus, systems, and methods are disclosed.

39 Claims, 16 Drawing Sheets

(51) Int. Cl.
*E21B 7/04* (2006.01)
*G09B 9/00* (2006.01)
*G09B 7/02* (2006.01)

(56) References Cited

U.S. PATENT DOCUMENTS

| | | | |
|---|---|---|---|
| 6,722,453 | B1 | 4/2004 | Crooks |
| 6,944,547 | B2 | 9/2005 | Womer et al. |
| 7,027,968 | B2 | 4/2006 | Choe et al. |
| 7,207,396 | B2 | 4/2007 | Hall et al. |
| 7,596,481 | B2 | 9/2009 | Zamora et al. |
| 7,730,967 | B2 | 6/2010 | Ballantyne et al. |
| 7,757,781 | B2 | 7/2010 | Hay et al. |
| 7,810,584 | B2 | 10/2010 | Haci et al. |
| 9,103,195 | B2 | 8/2015 | Gawski |
| 2003/0074139 | A1 | 4/2003 | Podjono |
| 2004/0088115 | A1 | 5/2004 | Guggari et al. |
| 2005/0063251 | A1 | 3/2005 | Guidry et al. |
| 2005/0149306 | A1 | 7/2005 | King |
| 2005/0199425 | A1 | 9/2005 | Estes et al. |
| 2005/0217896 | A1 | 10/2005 | Terentyev et al. |
| 2005/0284661 | A1 | 12/2005 | Goldman et al. |
| 2006/0161406 | A1* | 7/2006 | Kelfoun .................. 703/10 |
| 2010/0133008 | A1 | 6/2010 | Gawski et al. |
| 2010/0250139 | A1 | 9/2010 | Hobbs et al. |
| 2012/0026002 | A1 | 2/2012 | Vu et al. |
| 2012/0147006 | A1 | 6/2012 | Rothnemer |
| 2012/0274664 | A1 | 11/2012 | Fagnou |
| 2013/0341093 | A1* | 12/2013 | Jardine et al. .................. 175/40 |
| 2015/0240618 | A1 | 8/2015 | Gawski et al. |

FOREIGN PATENT DOCUMENTS

| | | |
|---|---|---|
| WO | WO-2005/090750 A1 | 9/2005 |
| WO | WO-2008/039523 A1 | 4/2008 |
| WO | WO-2014158706 A1 | 10/2014 |

OTHER PUBLICATIONS

"U.S. Appl. No. 12/442,637, Non Final Office Action mailed May 25, 2012", 8 pgs.
"U.S. Appl. No. 12/442,637, Preliminary Amendment filed Mar. 24, 2009", 3 pgs.
"U.S. Appl. No. 12/442,637, Response filed Feb. 25, 2013 to Final Office Action mailed Sep. 25, 2012", 17 pgs.
"U.S. Appl. No. 12/442,637, Response filed Aug. 27, 2012 to Non Final Office Action mailed May 25, 2012", 23 pgs.
"British Application Serial No. 0905326.5, Office Action mailed Jun. 3, 2011", 1 pg.
"British Application Serial No. 0905326.5, Office Action mailed Nov. 19, 2010", 3 pgs.
"British Application Serial No. 0905326.5, Response filed Oct. 3, 2011 to Office Action mailed Jun. 3, 2011", 12 pgs.
"British Application Serial No. 0905326.5, Response filed May 23, 2011 to Office Action mailed Nov. 19, 2010", 8 pgs.
"Directional Drilling Simulator", [online]. http://web.archive.org/web/20020827070154/http://www.utilitysafety.com/news/news_releases/archived_releases/12019901.htm, (Dec. 1, 1999), 1 pg.
"International Application Serial No. PCT/US2007/020867, International Preliminary Report on Patentability mailed Apr. 9, 2009", 10 pgs.
"International Application Serial No. PCT/US2007/020867, International Search Report mailed Jan. 3, 2008", 4 pgs.
"International Application Serial No. PCT/US2007/020867, Written Opinion mailed Jan. 3, 2008", 8 pgs.
"Malaysian Application Serial No. PI 20091086, Office Action mailed Dec. 31, 2010", 3 pgs.
"Malaysian Application Serial No. PI 20091086, Response filed Mar. 29, 2011 to Office Action mailed Dec. 31, 2010", (English Translation of Claims), 7 pgs.
"Malaysian Application Serial No. PI 20091086, Office Action mailed Oct. 31, 2012", 3 pgs.
"Malaysian Application Serial No. PI 20091086, Response filed Nov. 30, 2012 to Office Action mailed Oct. 31, 2012", 6 pgs.
"PayZone Drilling Simulator", [archived on May 23, 1997]. Retrieved from the Internet: <URL: http://web.archive.org/web/19970523235531/http://www.mse.berkeley.edu/faculty/cooper/simulator/payzone.html>, (1997), 2 pgs.
"PERFORMView—Real-time drilling monitoring and visualization software", www.slb.com/oilfield, PREFORMView, Schlumberger, (Dec. 2005), 2 pgs.
McKenney, Frank, "Drill Master", Getting the Most from your Directional Mud Motor, [retrieved on Sep. 13, 2012]. Retrieved from the Internet: <URL: http://www.trenchlessonline.com/index/webapp-stories-action?id=111>, (Dec. 1, 1998), 2 pgs.
"U.S. Appl. No. 12/442,637, Notice of Allowance mailed Apr. 7, 2015", 8 pgs.
"U.S. Appl. No. 12/442,637, Response filed Feb. 6, 2015 to Final Office Action mailed Aug. 6, 2014", 14 pgs.
"U.S. Appl. No. 14/710,088, Preliminary Amendment filed Aug. 24, 2015", 7 pgs.
"Canadian Application Serial No. 2,659,453, Office Action mailed Aug. 28, 2014", 4 pgs.
"U.S. Appl. No. 12/442,637, Final Office Action mailed Aug. 6, 2014", 9 pgs.
"U.S. Appl. No. 12/442,637, Non Final Office Action mailed Feb. 21, 2014", 9 pgs.
"U.S. Appl. No. 12/442,637, Response filed Jul. 16, 2014 to Non Final Office Action mailed Feb. 21, 2014", 14 pgs.
"International Application Serial No. PCT/US2014/019425, International Search Report mailed Jun. 9, 2014", 3 pgs.
"International Application Serial No. PCT/US2014/019425, Written Opinion mailed Jun. 9, 2014", 13 pgs.

\* cited by examiner

SNAPSHOT REPORT

HEADER
| | | OPERATION | DRILLING |
|---|---|---|---|
| DATE | 29/JUN/06 | TIME 18:30:29 | CURRENT MD: 9240.05 FT |
| WELL: 3DI_TEST500 | FIELD: | SLM REF: | A8-MW-OD43976590-500 |
| RUN 600 | RIG: | JOB NUMBER: | |
| SHA#: 1 | LOCATION: | CUSTOMER: | |

DRILLING DATA
| MD FT | INTERVAL FT | ROP FT/HR | DRILLING HOURS | CIRCULATING HOURS | REAMING HOURS | BRT HOURS | HOLE INCLINATION | HOLE AZIMUTH |
|---|---|---|---|---|---|---|---|---|
| 9240.05 | 8240.05 | | | | | | | |

| | WOB LB | OFF BOTTOM PRESSURE PSI | ON BOTTOM PRESSURE PSI | DIFFERENTIAL PRESSURE PSI | MOTOR OUTPUT RPM | STRING RPM | BIT RPM | FLOW RATE GPM | MOTOR OUTPUT TORQUE FT.LB |
|---|---|---|---|---|---|---|---|---|---|
| CURRENT | 24089 | 2100 (EST.) | 2830 | | 130 | 56 | 186 | 541 | 6078 |
| MAXIMUM: | 25669 | 2729 | 2830 | | | 76 | 209 | 548 | 6078 |

MOTOR
| MOTOR MODEL: | SPERRY DRILL | MOTOR TYPE: | REG | HOUSING ANGLE: | 0° |
|---|---|---|---|---|---|
| MOTOR SIZE: | 6-3/4 IN | STATOR TYPE: | REG | SLICKBORE: | |
| LOBS: | 6:7 | JETTED: | N | ROTOR COATING: | CHROME |
| STAGES: | 5:0 | JET SIZE: | | RUBBER TYPE: | |
| POWER UNIT: | PERFORMANCE | HOUSING: | | | |

BIT
| BIT SIZE: | 8.5" | BIT MODEL: | | GAUGE LENGTH: | |
|---|---|---|---|---|---|
| BIT TYPE: | TRICONA | JETS: | | AGGRESSION RATING: | |
| BIT MAKE: | | TFA | 0 IN^2 | INITIAL WEAR: | |

MUD
| MUD WT: | | BASE FLUID: | | CHLORIDES: | |
|---|---|---|---|---|---|
| PV: | | ADDITIVES: | | MOTOR COMPATIBILITY: | LOW |
| VP: | | SAND: | | | |

MOTOR PERFORMANCE GRAPH

[Graph showing MOTOR RPM and TORQUE (FT.LB) vs ODP-OPERATING DIFFERENTIAL PRESSURE ACROSS MONITOR (PSI). 71 RPM @ 541 GPM; 6078 FT.LB at MAX ODP.]

COMMENTS:
MOTOR MICRO-STALL @ 9.240 FT. 6,078 FT.LBS (+500 PSI OVER USUAL MOTOR OPERATING DIFFERENTIAL PRESSURES)

Fig. 9

SIZE AND FIT SUMMARY REPORT (2)

CALCULATED FIT AT START OF RUN

| MEASUREMENTS TAKEN | TEMPERATURE WHEN MEASURED | FIT AT AV. SMIN | FIT RANGE AT SMIN | |
|---|---|---|---|---|
| | | | (LOOSEST) | (TIGHTEST) |
| PRE-RUN | 185.0°F PLANNED START | 0.018 (COMPRESSION) | -0.005 (CLEARANCE) | 0.036 (COMPRESSION) |
| POST-RUN | 199.0°F ACTUAL START | 0.019 (COMPRESSION) | -0.004 (CLEARANCE) | 0.037 (COMPRESSION) |
| DIFFERENCE BETWEEN PLANNED AND ACTUAL START RUN FIT | 0.001 | | | |

CALCULATED FIT AT END OF RUN

| MEASUREMENTS TAKEN | TEMPERATURE WHEN MEASURED | FIT AT AV. SMIN | FIT RANGE AT SMIN | |
|---|---|---|---|---|
| | | | (LOOSEST) | (TIGHTEST) |
| PRE-RUN | 212.0°F PLANNED END | 0.022 (COMPRESSION) | -0.001 (CLEARANCE) | 0.036 (COMPRESSION) |
| POST-RUN | 225.0°F ACTUAL END | 0.022 (COMPRESSION) | 0.001 (CLEARANCE) | 0.037 (COMPRESSION) |
| DIFFERENCE BETWEEN PLANNED AND ACTUAL END RUN FIT | 0.000 | | | |

[Bar charts: FIT AND TEMPERATURE AT START AND END OF RUN; DIFFERENCE BETWEEN PLANNED AND ACTUAL FIT; DIFFERENCE BETWEEN PLANNED AND ACTUAL TEMPERATURE]

ROTOR / STATOR SIZE & FIT EVALUATION

START RUN:
THERE WAS A +5.6°C (10.0°F) DIFFERENCE BETWEEN THE PLANNED START RUN TEMPERATURE OF 85.0°C (185.0°F) AND THE ACTUAL START RUN TEMPERATURE 90.6°C(196.0F). THIS RESULTED IN A +0.001° DIFFERENCE BETWEEN THE PLANNED START RUN FIT OF 0.018° AND THE ACTUAL START RUN FIT OF 0.019°. BOTH PLANNED AND ACTUAL START RUN FITS WERE CALCULATED USING PRE-RUN SIZES. TEMPERATURE EFFECT ON STATOR ELASTOMETER CAUSED A -0.038° CHANGE IN STATOR MINOR SIZE FROM SURFACE. (PRE-RUN SIZE AT PRE-RUN AMBIENT SURFACE TEMPERATURE OF 3.784° COMPARED WITH PRE-RUN SIZE ADJUSTED TO ACTUAL START RUN TEMPERATURE OF 3.696°)

END RUN:
THERE WAS A +7.2°C (13.0°F) DIFFERENCE BETWEEN THE PLANNED END RUN TEMPERATURE OF100.0°C (212.0°F) AND THE ACTUAL END RUN TEMPERATURE 107.2°°C(225.0F). THERE WAS NO DIFFERENCE BETWEEN THE PLANNED START RUN FIT OF 0.022° AND THE ACTUAL START RUN FIT OF 0.022°. THE ACTUAL START RUN FITS WERE CALCULATED USING POST-RUN SIZES AT ACTUAL END RUN TEMP. THERE WAS AN EFFECTIVE 0.007° CHANGE IN STATOR SMIN SIZE OVER THE MOTOR RUN. (PRE-RUN SIZE ADJUSTED TO ACTUAL START RUN TEMPERATURE OF 3.669° COMPARED WITH POST RUN SIZE ADJUSTED TO ACTUAL END RUN TEMPERATURE OF 3.696°)

ACTUAL END RUN FIT:
THE ACTUAL END RUN FIT OF 0.022° WAS AFFECTED BY FOLLOWING FACTORS:
TEMPERATURE EFFECT ON STATOR ELASTOMETER CAUSED A -0.048° CHANGE IN STATOR SMINOR SIZE. (POST-RUN SIZE ADJUSTED TO PRE-RUN AMBIENT SURFACE TEMPERATURE OF 3.737° COMPARED WITH POST RUN SIZE ADJUSTED TO ACTUAL END RUN TEMPERATURE OF 3.689°)

STATOR SMINOR SIZE CHANGE OF +0.003° (PRE-RUN SIZE 3.734° AND POST-RUN SIZE 3.373° CORRECTED TO PRE-RUN AMBIENT TEMP.)

ROTOR RMAJOR SIZE CHANGE OF -0.002° (PRE-RUN SIZE O4.311° AND POST-RUN SIZE 4.309)

CONSEQUENTLY, THE MOST DOMINANT EFFECT ON THE ACTUAL END RUN FIT WAS THE TEMPERATURE EFFECT ON STATOR SMINOR SIZE. STATOR SIZE CHANGE HAVING A LESSOR EFFECT AND ROTOR RMAJOR SIZE CHANGE HAVING THE LEAST EFFECT

NOTES:
THERE WAS AN INCREASE OF 16.6°C (30.0°F) FROM THE ACTUAL START RUN TEMPERATURE OF 90.6°C (195.0°F) TO THE ACTUAL END RUN TEMPERATURE OF 107.2°C (225.0°F). THIS COMPARES WITH A PLANNED INCREASE OF15.0°C (27.0°F) BETWEEN THE PLANNED START RUN OF 85.0°C (185.0°F) AND THE PLANNED END RUN TEMPERATURE OF 100.0°C (212.0°F).

Fig. 11

MONITOR AND CONTROL OF DIRECTIONAL DRILLING OPERATIONS AND SIMULATIONS

RELATED APPLICATIONS

This application is a continuation-in-part of U.S. application Ser. No. 12/442,037, filed Feb. 9, 2010, which is a U.S. National Stage Filing under 35 U.S.C. 371 from International Application Number PCT/US2007/020867, filed Sep. 27, 2007 and published in English as WO 2008/039523 A1 on Apr. 3, 2008, which claims the benefit under U.S. Provisional Application Ser. No. 60/827,209, filed Sep. 27, 2006, under 35 U.S.C. 119(e), which applications and publication are incorporated herein by reference in their entirety.

TECHNICAL FIELD

The application relates generally to downhole drilling. In particular, the application relates to a monitoring and control of directional drilling operations and simulations.

BACKGROUND

Directional drilling operations typically allow for greater recovery of hydrocarbons from reservoirs downhole.

BRIEF DESCRIPTION OF THE DRAWINGS

Embodiments of the invention may be best understood by referring to the following description and accompanying drawings which illustrate such embodiments. In the drawings:

FIG. 9 illustrates a report generated for a directional drilling operation/simulation, according to some embodiments of the invention.

FIGS. 10-11 illustrate another set of reports for a directional drilling operation/simulation, according to some embodiments of the invention.

DETAILED DESCRIPTION

Figure 1:
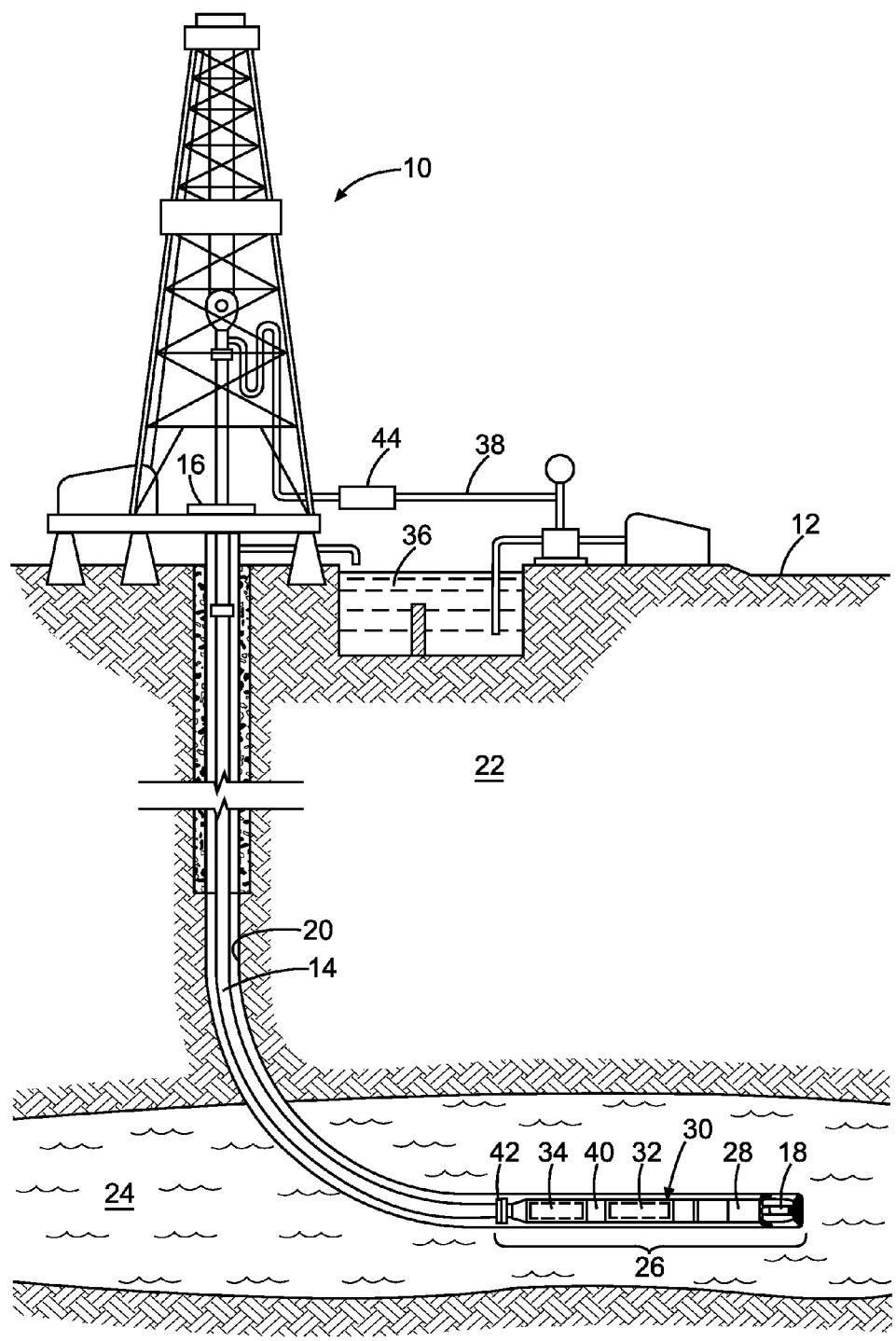
FIG. 1 illustrates a system for drilling operations, according to some embodiments of the invention.

Methods, apparatus and systems for monitor and control of directional drilling operations/simulations are described. In the following description, numerous specific details are set forth. However, it is understood that embodiments of the invention may be practiced without these specific details. In other instances, well-known circuits, structures and techniques have not been shown in detail in order not to obscure the understanding of this description.

This description of the embodiments is divided into five sections. The first section describes a system operating environment. The second section describes a computer operating environment. The third section describes graphical and numerical representations for a directional drilling operation/simulation. The fourth section describes load monitoring among downhole components. The fifth section provides some general comments.

Embodiments allow for monitoring and controlling of directional drilling operations and simulations. Embodiments may include graphical and numerical output of data received and processed from different sensors (including those at the surface and downhole). A 'rotary' drilling bottom hole assembly (BHA), downhole drilling motor, drilling turbine or downhole drilling tool such as a rotary steerable tool allows for directional drilling. The functioning of a BHA, downhole drilling motor, drilling turbine or rotary steerable tool in the dynamic downhole environment of an oilwell is relatively complex since operating parameters applied at surface (such as flow rate, weight on bit and drill string rotation rate) are combined with other characteristics of the downhole drilling operation. These other characteristics include formation characteristics (such as rock strength and geothermal temperature), characteristics of additional tools that are incorporated in the BHA (such as the drill bit), characteristics of the drilling fluids (such as lubricity), etc.

The application of sub-optimal operating parameters, excessive operating parameters and the undertaking of inappropriate actions during specific functional occurrences during motor operations downhole, are some of the problems that are encountered during a directional drilling operation.

Design engineers, support engineers, marketing personnel, repair and maintenance personnel and various members of a customer's personnel may never be present on a rig floor. Also there can be an effective disconnection between the directional driller on the rig floor and a functioning BHA, downhole drilling motor, drilling turbine or rotary steerable tool, thousands of feet below surface. Therefore, such persons do not have an accurate appreciation of the effect that surface applied operating parameters and the downhole operating environment can have on a drilling motor, drilling turbine or a rotary steerable tool as the motor/tool functions downhole.

Using some embodiments, operations personnel, design engineers, support engineers, marketing personnel, repair and maintenance personnel and customers can potentially add to their understanding of BHAs, downhole drilling motors, drilling turbines and rotary steerable tools in terms of the rig floor applied operating parameters and the resulting loads that they produce on motors/tools, which ultimately affect motor/tool performance. A more advanced understanding of the functioning of BHAs, downhole drilling motors, drilling turbines or rotary steerable tools by personnel from various disciplines would produce benefits form the design phase through to the post-operational problem investigation and analysis phase.

Embodiments would allow users to effectively train on a simulator through the control of the BHA, downhole drilling motor, drilling turbine or rotary steerable tool operations while avoiding the cost and potential safety training issues normally associated with rigsite and dynamometer testing operations. Embodiments would encourage a better understanding of the balance of motor/tool input and output with respect to the characteristics of the downhole operating environment and also with respect to motor/tool efficiency, reliability and longevity.

Some embodiments provide a graphical user interface (GUI) for monitoring a directional drilling operation. Some embodiments may be used in an actual drilling operation. Alternatively or in addition, some embodiments may be used in a simulation for training of operators for directional drilling. Data from sensors at the surface and downhole may be processed. A graphical and numerical representation of the operations downhole may be provided based on the processed data. Some embodiments may illustrate the performance of the BHA, downhole drilling motor, drilling turbine and rotary steerable tool used in directional drilling operations. Some embodiments may graphically illustrate the rotations per minute (RPMs) of and the torque applied by the downhole motor, drilling turbine or rotary steerable tool, the operating differential pressure across the motor, turbine, tool, etc. A cross-sectional view of the motor, turbine, tool within the drill string may be graphically shown. This view may show the rotations of the drill string in combination with the motor, turbine, and tool. Accordingly, the driller may visually track the speed of rotation of the drilling motor/rotary steerable tool and adjust if necessary. The following description and accompanying figures describe the monitoring and control of a drilling motor. Such description is also applicable to various types of rotary BHA's, drilling turbines and rotary steerable tools.

FIG. 1 illustrates a system for drilling operations, according to some embodiments of the invention. FIG. 1 illustrates a directional drilling operation. The drilling system comprises a drilling rig 10 at the surface 12, supporting a drill string 14. In some embodiments, the drill string 14 is an assembly of drill pipe sections which are connected end-to-end through a work platform 16. In alternative embodiments, the drill string comprises coiled tubing rather than individual drill pipes. A drill bit 18 couples to the lower end of the drill string 14, and through drilling operations the bit 18 creates a borehole 20 through earth formations 22 and 24. The drill string 14 has on its lower end a bottom hole (BHA) assembly 26 which comprises the drill bit 18, a logging tool 30 built into collar section 32, directional sensors located in a non-magnetic instrument sub 34, a downhole controller 40, a telemetry transmitter 42, and in some embodiments a downhole motor/rotary steerable tool 28.

Drilling fluid is pumped from a pit 36 at the surface through the line 38, into the drill string 14 and to the drill bit 18. After flowing out through the face of the drill bit 18, the drilling fluid rises back to the surface through the annular area between the drillstring 14 the borehole 20. At the surface the drilling fluid is collected and returned to the pit 36 for filtering. The drilling fluid is used to lubricate and cool the drill bit 18 and to remove cuttings from the borehole 20.

The downhole controller 40 controls the operation of telemetry transmitter 42 and orchestrates the operation of downhole components. The controller processes data received from the logging tool 30 and/or sensors in the instrument sub 34 and produces encoded signals for transmission to the surface via the telemetry transmitter 42. In some embodiments telemetry is in the form of mud pulses within the drill string 14, and which mud pulses are detected at the surface by a mud pulse receiver 44. Other telemetry systems may be equivalently used (e.g., acoustic telemetry along the drill string, wired drill pipe, etc.). In addition to the downhole sensors, the system may include a number of sensors at the surface of the rig floor to monitor different operations (e.g., rotation rate of the drill string, mud flow rate, etc.).

In some embodiments, the data from the downhole and the surface sensors is processed for display (as further described below). The processor components that process such data may be downhole and/or at the surface. For example, one or more processors in a downhole tool may process the downhole data. Alternatively or in addition, one or more processors either at the rig site and/or at a remote location may process the data. Moreover, the processed data may then be numerically and graphically displayed (as further described below).

Figure 2:
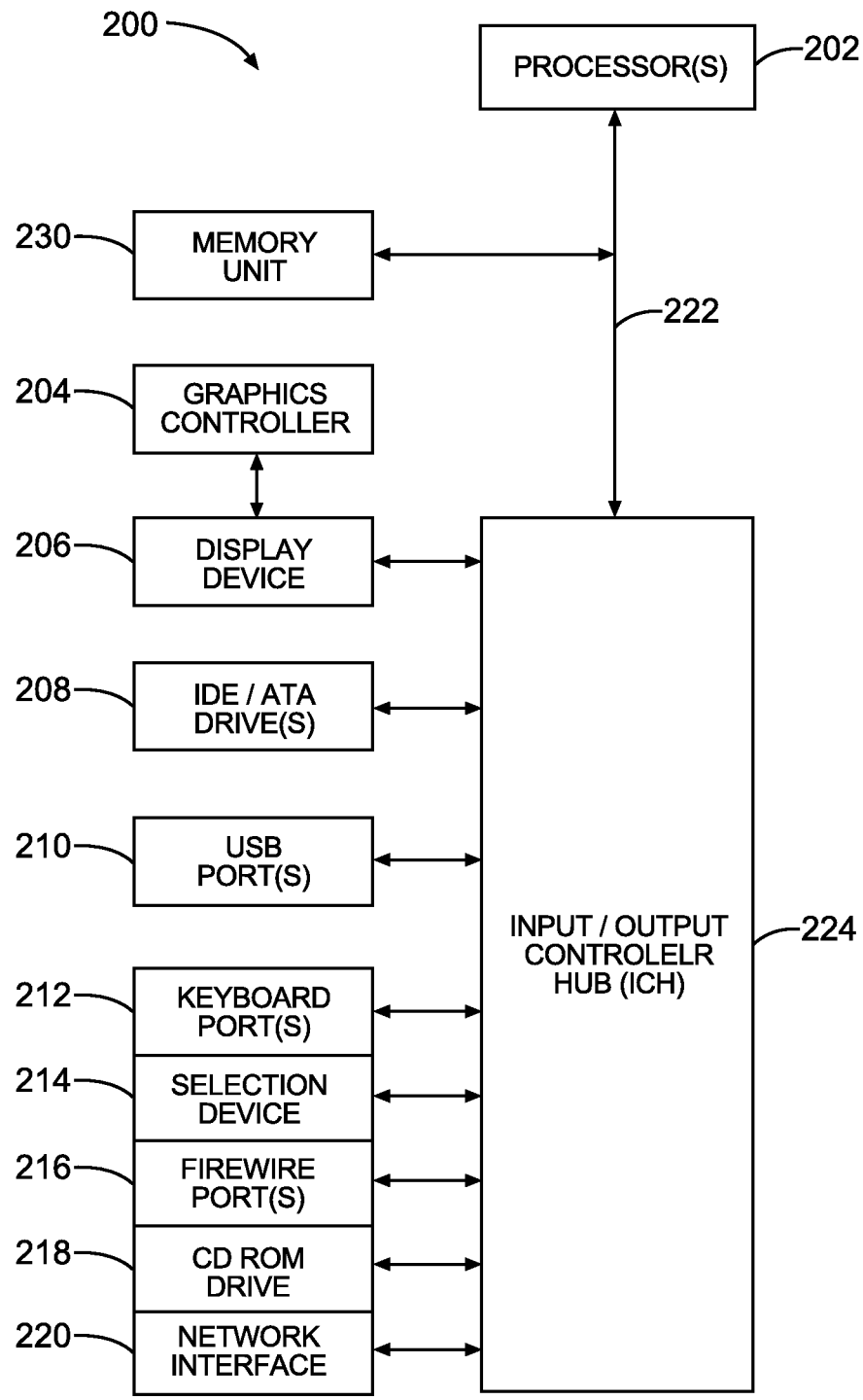
FIG. 2 illustrates a computer that executes software for performing operations, according to some embodiments of the invention.

An example computer system, which may be used to process and/or display the data is now described. In particular, FIG. 2 illustrates a computer that executes software for performing operations, according to some embodiments of the invention. The computer system 200 may be representative of various components in the system 200. For example, the computer system 200 may be representative of parts of the downhole tool, a computer local to the rig site, a computer remote to the rig site, etc.

As illustrated in FIG. 2, the computer system 200 comprises processor(s) 202. The computer system 200 also includes a memory unit 230, processor bus 222, and Input/Output controller hub (ICH) 224. The processor(s) 202, memory unit 230, and ICH 224 are coupled to the processor bus 222. The processor(s) 202 may comprise any suitable processor architecture. The computer system 200 may comprise one, two, three, or more processors, any of which may execute a set of instructions in accordance with embodiments of the invention.

The memory unit 230 may store data and/or instructions, and may comprise any suitable memory, such as a dynamic random access memory (DRAM). The computer system 200 also includes IDE drive(s) 208 and/or other suitable storage devices. A graphics controller 204 controls the display of information on a display device 206, according to some embodiments of the invention.

The input/output controller hub (ICH) 224 provides an interface to I/O devices or peripheral components for the computer system 200. The ICH 224 may comprise any suitable interface controller to provide for any suitable communication link to the processor(s) 202, memory unit 230 and/or to any suitable device or component in communication with the ICH 224. For one embodiment of the invention, the ICH 224 provides suitable arbitration and buffering for each interface.

For some embodiments of the invention, the ICH 224 provides an interface to one or more suitable integrated drive electronics (IDE) drives 208, such as a hard disk drive (HDD) or compact disc read only memory (CD ROM) drive, or to suitable universal serial bus (USB) devices through one or more USB ports 210. For one embodiment, the ICH 224 also provides an interface to a keyboard 212, a mouse 214, a CD-ROM drive 218, one or more suitable devices through one or more firewire ports 216. For one embodiment of the invention, the ICH 224 also provides a network interface 220 though which the computer system 200 can communicate with other computers and/or devices.

In some embodiments, the computer system 200 includes a machine-readable medium that stores a set of instructions (e.g., software) embodying any one, or all, of the methodologies for described herein. Furthermore, software may reside, completely or at least partially, within memory unit 230 and/or within the processor(s) 202.

Directional drilling is based on decisions being made by the directional driller which are the result of information being made available to the driller at the rig floor, in logging units at the rig site (not at the rig floor), and on the directional driller's conceptions about equipment performance and functioning. The decisions made by the directional driller have a direct bearing on the drilling operating parameters applied at surface to drilling tools downhole. Embodiments provide for real time representation of comprehensive directional drilling data at rig floor (on an intrinsically safe computer or purged driller's control unit or "dog house"), at rig site (data logging unit or office) and remotely (office or dedicated Remote Technical Operations (RTO) Center of the directional drilling supplier and/or oil company).

An important part of the directional drilling process is the interaction of the drill bit with the formation in terms of the torque and RPM applied to the drill bit and the loading imparted into the formation to locally fail and remove the formation. Another important part is how the torque and RPM applied at the drill bit causes reactive mechanical loadings in the bottom hole drilling assembly tools which affect the trajectory of the hole drilled.

Maintaining a consistent level of torque and revolutions on the drill bit may achieve and maintain good formation penetration rate, good hole directional control, etc. Moreover, this consistent level allows the maximization of the reliability and longevity of various downhole drilling tools in the bottom hole drilling assembly (fluctuating mechanical and pressure loadings accelerate the wear and fatigue of components).

While drilling, the drill bit has a number of sources of excitation and loading. These sources may cause the bit speed to fluctuate, the bit to vibrate, the bit to be excessively forced into the formation, and in some cases the bit to actually bounce off the hole bottom. The application of weight to the bit (by slacking off the rig hook load) may be a source of excitation and loading. There can be a number of these sources, which can negatively affect the face of the drill bit and formation interaction. For example, some of the weight applied at surface at times is not transmitted to the drill bit because the drillstring and bottom hole assembly contact the casing and hole wall causing substantial frictional losses. The drill string can then suddenly "free-off" resulting in remaining, previously hung-up weight, being abruptly transferred to the drill bit with resulting heavy reaction loadings being applied to the tools (internals and housings) in the bottom hole drilling assembly. Another example of such a source relates to the application of torque at the surface. At times, not all of the torque is transmitted to the drill bit. The drill string may be subsequently freed, such that high torsional loadings may be abruptly applied to tools in the bottom hole drilling assembly.

Another example of sources of excitation and loading relate to floating semi-submersible drilling rigs and drillships. In such operations, the consistent application of weight to the bit is undertaken via the use of wave heave compensators. However, these compensators can often not be 100% effective and harsh weather can also exceed their capability. Weight applied at the bit fluctuates significantly, which can cause great difficulty when undertaking more precise directional control drilling operations. In some cases the bit can actually lift off bottom.

The above scenarios are often not observable at surface by the directional driller. Embodiments may process relevant data. Through graphic and numerical representation, embodiments may indicate fluctuations in the drill bit rotation and in drilling motor/rotary steerable tool output torque and RPM characteristics. The grouped presentation of this data has not been previously available to the live rig floor directional drilling process. Embodiments also allow such events to be considered in detail from recorded well data and contingencies to be established. Some embodiments are applicable to rotary drilling assemblies where there is no drilling motor in the bottom hole drilling assembly, such as rotary steerable drilling assemblies.

Until now the data which is available in relation to the directional drilling process has not been available to the directional driller in real time in one location. Moreover, conventional techniques have required a significant level of conception by the directional driller and ideally have included interpretation and input by specialists other than the directional driller who are not present on the rig floor. As the electronic instrumentation of downhole drilling tools continues to develop, ever increasing amounts of data are becoming available from downhole on which the directional drilling process can be made more efficient and effective.

Embodiments provide a central platform on which to display dynamic numerical and graphical data together. In addition to displaying data generated by sensors contained within downhole tools, embodiments may provide a platform where alongside sensor data, very recently developed and further developing cutting-edge directional drilling engineering modeling data, can be jointly displayed. Moreover, embodiments may interpret and provide a dynamic indication of occurrences downhole that have to date otherwise gone unnoticed live at the rig floor by the directional driller (e.g. drilling motor/rotary steerable tool micro-stalling, downhole vibration, and drill bit stick-slip, etc.).

Embodiments may also process data and display to the directional driller the level of loading being applied to downhole tools in terms of overall efficiency of the drilling system, mechanical loadings such as fatigue tendencies and estimated reliability of specific downhole tools. This in effect provides the directional driller with a far more comprehensive picture and understanding of the complete directional drilling process based on dynamic numerical data (sensors and modeled data), dynamic graphics, and estimations or look-aheads in terms of equipment reliability (based on empirical knowledge, dynamometer testing data and engineering design data). The data may be obtained direct from surface and downhole sensors and from modeled data based on sensor data inputs processed by the embodiments. The processing may be based on data obtained from dynamometer testing, and via drilling industry and classic engineering theory.

Embodiments provide dynamic graphics and digital estimations or look-aheads in terms of both the directional drilling behavior of the downhole drilling assembly and downhole drilling equipment reliability.

An important component to many directional drilling applications is the optimum application of downhole drilling motors and rotary steerable tools. Embodiments may provide dynamic graphical and numerical representations of drilling motors and rotary steerable tools in operation in terms of the differential operating pressure across motors and loadings applied by the drill string to rotary steerable tools. Furthermore, embodiments may provide dynamic drilling motor/rotary steerable tool input/output performance graphs, to aid the directional driller's perception and decision making.

Embodiments allow for real time representation of drilling motor/rotary steerable tool operating differential pressure for the directional drilling operation. Conventionally, the directional driller had to reference an off-bottom standpipe pressure value at rig floor in relation to the dynamic on-bottom pressure value at rig floor. The driller could then deduce the resulting pressure differential and conceive the result of this in terms of motor/tool output torque and motor/tool RPM (as applied to the bit). Embodiments show these pressure differentials and resulting torque and RPM values both through a dynamic performance graph and a numerical representation. In some embodiments, the real time representations (as described) may be displayed local as well as remote relative to the rig site.

Some embodiments may allow for simulation of a directional downhole drilling operation. Some embodiments offer an aid to the understanding of the functioning of a downhole drilling motor/rotary steerable tool by allowing the simulator operator to see and control the results of their applied motor/tool operating parameters real-time. The simulator operator may choose from various types of drilling conditions, may control Weight On Bit (WOB), flow rate, drillstring rotation rate. Moreover, the operator may simultaneously see the resulting differential pressure across the motor/tool.

The simulator operator may see where the resultant motor or rotary steerable tool output torque and Rotations Per Minute (RPMs) figure on a performance graph for the motor/tool. In some embodiments, the simulator operator may also see an animated cross sectional graphic of the rotor rotate/precess in the stator and may see the stator rotate due to the application of drillstring rotation (at 1:1 speed ratio or scaled down in speed for ease of viewing). The operator can also see motor/tool stalling, may get a feel for how much load is induced in the motor/tool, may see simulated elastomer heating and chunking, and may be given an indication of what effect this has on overall motor/tool reliability.

Some embodiments allow the operator to select optimum drilling parameters and objectives for particular drilling conditions and to tune the process to provide an efficient balanced working system of inputs versus outputs. In some embodiments, once that control has been achieved and held, the system may project what the real life outcome should be in terms of a sub-50 hr run or in excess of 50, 100,150, or 200 hr runs. Using some embodiments, simulator operators are encouraged to understand that high Rate Of Penetration (ROP) and operations at high motor or rotary steerable tool loadings are to be considered against potential toolface control/stall occurrence issues and corresponding reduced reliability and longevity issues.

In some embodiments, problem scenarios may be generated by the system and questions asked of the operator regarding the problem scenarios in terms of weighing up the problem indications against footage/time left to drill, drilling conditions, etc., in the particular application. Problem scenarios that are presented in relevant sections of a technical handbook may be referenced via hypertext links (i.e. the operator causes a motor/tool stall and they get linked to the items about 'stall' in the handbook).

In some embodiments, the simulator may include a competitive user mode. For the 'competitive user' mode there is a scoring system option and ranking table for sessions. Different objective settings could be selected (i.e. drill a pre-set footage as efficiently/reliably as possible, or drill an unlimited footage until predicted tool problems or reduced tool wear/efficiency/reliability cause operations to be stopped). A score may be obtained which may be linked to one or more of a number of parameters. The parameters may include one or more of the following:

- chosen operating settings given the drilling situation selected by the user
- maintaining operating parameters such that reliability of the motor/tool is ensured, etc.
- ROP/footage drilled
- the number of stall occurrences
- reactions to stall situations
- the reaction to various problem occurrences that occur
- overall process efficiency for the duration of the simulator session The simulator may allow for a number of inputs and outputs. With regard to inputs, the simulator may allow for a configuration of one or more of the following:

- size and type of motor or rotary steerable tool (e.g., outside diameter of the tool)
- size and type of tool (e.g., motor, rotary steerable tool, adjustable gauge stabilizer, etc.)
- stator elastomer type: high temperature/low temperature
- rotor/stator mating fit at surface: compression/size for size/clearance high/low
- rotor jet nozzle fitted? yes/no (allow user to go to calculator from handbook) size?
- motor bent housing angle setting
- motor sleeve stabilizer gauge
- string stabilizer gauge Other inputs for the simulator may include one or more of the following:

- General Formation Type say 1 to 5 (soft to hard formation)
- Stringers In Formation?: Yes/No
- Bit Type: Rollercone/PDC/Diamond
- Bit Diameter
- Bit Gauge
- Bit Manufacturers Details/Serial Number
- Bit Aggression Rating:
- Bit Jets: number/sizes
- Mud Type: Oil Base, Water Base, Pseudo Oil Base Other inputs for the simulator may also include one or more of the following:

- Max WOB
- Min/Max Flow Rate
- Max String Rotation Rate
- Minimum Acceptable ROP
- Maximum ROP
- Maximum Operating Differential Pressure
- Maximum Reactive Torque From Motor/Tool
- Downhole Operating Temperature
- Temperature At Surface
- Axial Vibration Level
- Lateral Vibration Level
- Torsional Vibration Level Some real time operator control inputs may include one or more of the following:
  Drilling Mud Flow Rate (GPM)
  Drillstring Rotation Rate (RPM)
  Weight On Bit (KLbs)
  Azimuth
  Inclination In some embodiments, the simulator may allow for different graphical and numerical outputs, which may include one or more of the following:
  Motor/Tool RPM/Torque/Horsepower performance graph with moving cross hairs applied (performance graph indicating entry into the transition zone and stall zone)
  Animated cross sectional view of power unit rotor/stator showing rotor rotation and precession
  Motor/Tool operating differential pressure gauge indicating entry into the transition zone and stall zone
  Possible animated longitudinal cross section view of the power unit rotor/stator which shows the drilling mud going between the rotor and stator (rotor rotating and fluid cavities moving), (may also include a view of the full motor/tool i.e. show fluid flow over the transmission unit and through the driveshaft/bearing assembly).
  Drillstring RPM, mud pump GPM and WOB controllers
  Motor/Tool output RPM and output torque
  Actual bit RPM (drillstring RPM+motor/tool output RPM, allowing for motor/tool volumetric inefficiency etc)
  Actual, minimum, maximum and average ROP indicators
  Overall efficiency/reliability indicator
  Stall occurrence indicator
  Current and overall response to events indicator (program puts up items such a full or micro-stall, stringers, bit balling etc)
  Various warning alarm noises incorporated Other graphical and numerical outputs may include one or more of the following:
  Rotor/Stator Fit Change Due To Downhole Temperature
  Elastomer temperature indicator
  stator temperature/damage tendency (alarm on cracking, tearing, chunking)
  Cumulative footage drilled
  for burst and overall ROP
  reactive torque
  the number of stalls indicator (micro and full)
  time for reactions to stall situations
  the overall process efficiency for the duration of the simulator session/tie into reliability indicator In some embodiments, other graphical and numerical outputs may include one or more of the following:
  Maximum WOB
  Minimum/Maximum Flow Rate
  Bit Whirl Outputs
  Axial Vibration Level
  Lateral Vibration Level
  Torsional Vibration Level In some embodiments, other graphical and numerical outputs may include one or more of the following:
  Real-time rotor/stator cross sectional animation
  Analogue type standpipe pressure gauge animation
  Interactive user controls: GPM, WOB, drillstring rotation rate
  Stall Indicator, Micro Stall Indicator
  User Screen Indicators:
    WOB
    Flow rate (minimum/maximum)
    String RPM (maximum)
    Motor/tool differential pressure
    Motor/tool torque
    Motor/tool output RPM
    Actual bit RPM (string and motor)
    Micro-stall occurrences
    Full stall occurrences
    Min acceptable ROP
    Cumulative footage drilled
    Elapsed time
    Actual and Average ROP
    Overall efficiency/reliability level, rating
    Stator damage tendency
    Formation (Basic)
    General formation drillability type, i.e. 1 to 5 (easy to hard drilling)

In some embodiments, other graphical and numerical outputs may include some advanced outputs, which may include one or more of the following:
  Rotor/Stator Fit Change Due To Downhole Temperature
  Elastomer temperature indicator
  stator temperature/damage tendency (alarm on cracking, tearing, chunking)
  Cumulative footage drilled
  for burst and overall ROP
  reactive torque
  the number of stalls indicator (micro and full)

In some embodiments, the interface may include a tally book. The tally book may display real-time recording of data and notes. The tally book may be an editable document that may be accessible for download for future reference. In some embodiments, the data that is displayed may be recorded and graphically replayed. Accordingly, drilling tool problem occurrences may be analyzed and displayed to customers.

Some embodiments may be used for both actual and simulated drilling operations for different modes including a motor Bottom Hole Assembly (BHA) and BHA with drilling motor and tools above and below (e.g. underreamer and rotary steerable tool), etc.

Figure 3:
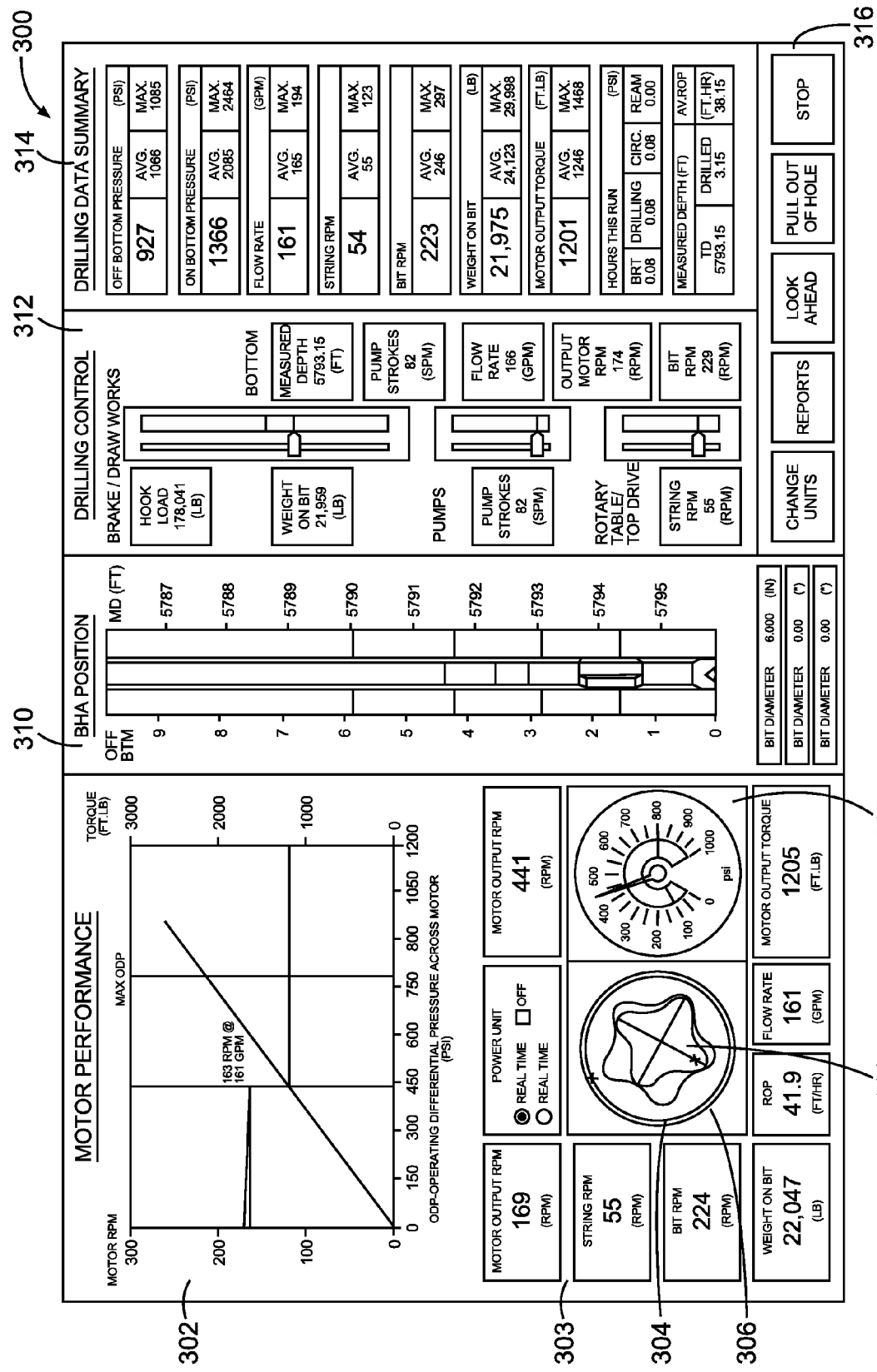
FIG. 3 illustrates a graphical user interface (GUI) screen that allows for controlling and monitoring of a directional drilling operation/simulation, according to some embodiments of the invention.

Various graphical user interface screens for display of graphical and numerical output for monitoring and controlling of a drilling operation/simulation are now described. FIG. 3 illustrates a graphical user interface (GUI) screen that allows for controlling and monitoring of a directional drilling operation/simulation, according to some embodiments of the invention. A GUI screen 300 includes a graph 302 that tracks the performance of the downhole motor. The graph 302 illustrates the relationship among the motor flow rate and RPM, the operating differential pressure across the downhole motor and the torque output from the downhole motor. A graphic 303 of the GUI screen 300 illustrates graphical and numerical data for the downhole drilling motor. A graphic 304 illustrates a cross-section of a drill string 306 that houses a downhole motor 308. The downhole motor 308 may include a positive displacement type helically lobed rotor and stator power unit, where, for a given flow rate and circulating fluid properties, the operating differential pressure across the power unit is directly proportional to the torque produced by the power unit. As shown, the downhole motor 308 includes a number of lobes on a rotor that fit into a number of lobed openings in a stator housing 306. As the pressurized drilling fluid flows through the openings between the lobes, one or more of the lobes engage one or more of the openings, thereby enabling rotation. The graphic 304 may be updated based on sensors to illustrate the rotation of both the drill string 306 and the downhole motor 308. Accordingly, the drilling operator may visually track the rotation and adjust if necessary.

A graphic 305 illustrates a meter that tracks the differential pressure across the downhole drilling motor. The graphic 303 also includes numerical outputs for a number of attributes of the motor, drill bit and drill string. For example, the graphic 303 includes numerical outputs for the motor output RPMs, the drill string RPMs, the drill bit RPMs, the weight on bit, the power unit, the differential pressure, the rate of penetration, the flow rate and the motor output torque.

A graphic 310 of the GUI screen 300 illustrates the position of the BHA (including the depth in the borehole and the distance that the bit is from the bottom). A graphic 312 of the GUI screen 300 illustrates data related to drilling control (including brake/draw works, pumps and rotary table/top drive). A graphic 314 of the GUI screen 300 provides a drilling data summary (including off bottom pressure, on bottom pressure, flow rate, string RPM, bit RPM, weight on bit, motor output torque, hours for the current run, measured depth and average ROP).

A graphic 316 of the GUI screen 300 includes a number of buttons, which allows for the units to be changed, to generate reports from this drilling operation, to perform a look ahead for the drilling operation, to remove the drill string from the borehole and to stop the drilling operation/simulation.

Figure 4:
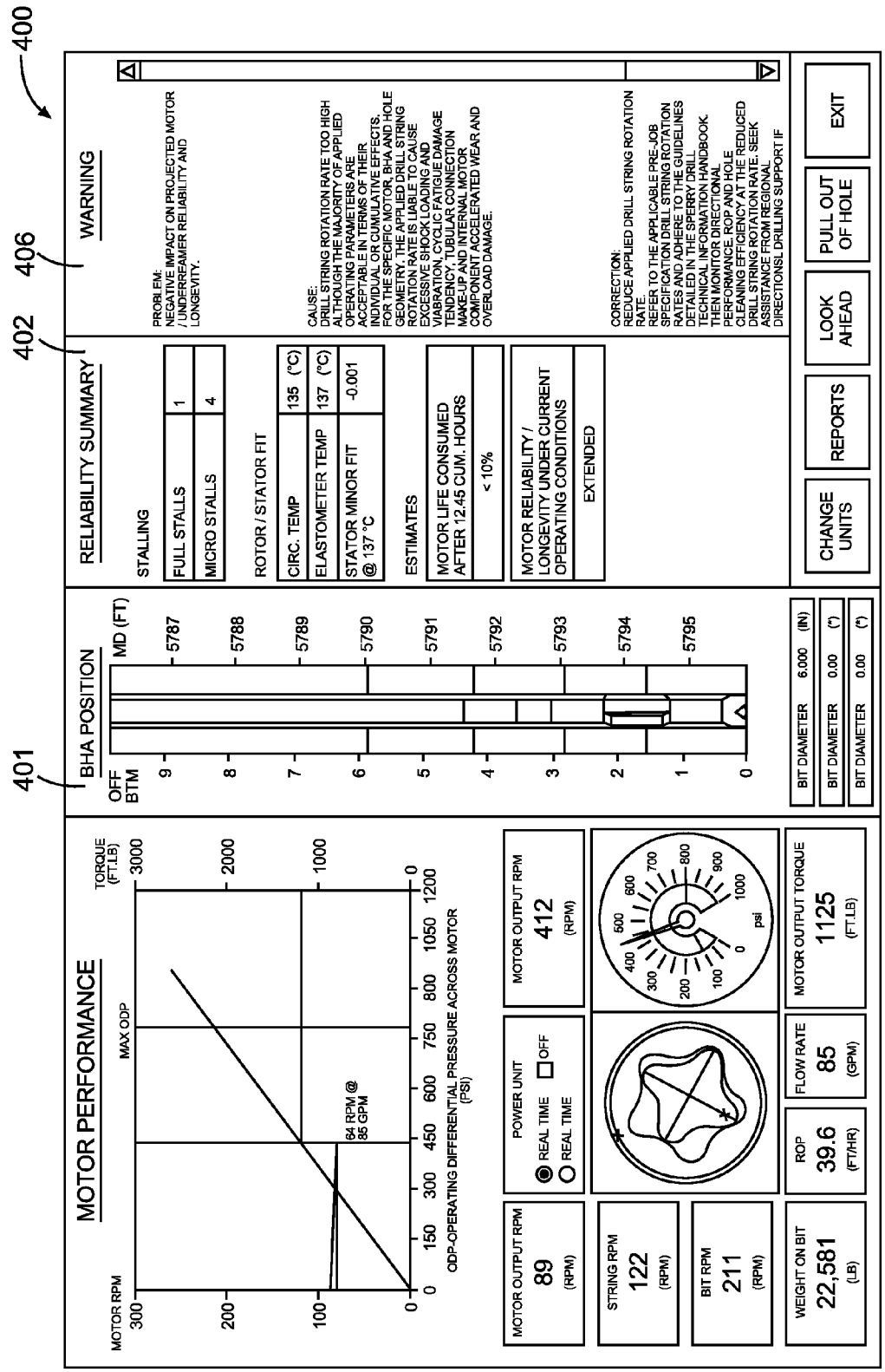
FIG. 4 illustrates a GUI screen that allows for controlling and monitoring of a directional drilling operation/simulation, according to some other embodiments of the invention.

FIG. 4 illustrates a graphical user interface (GUI) screen that allows for controlling and monitoring of a directional drilling operation/simulation, according to some other embodiments of the invention. A GUI screen 400 has some of the same graphics as the GUI screen 300. In addition, the GUI screen 400 includes some additional graphics.

The GUI screen 400 includes a graphic 401. The graphic 401 illustrates the position of the drill bit (including the depth in the borehole and the distance that the bit is from the bottom). The GUI screen 400 includes a graphic 402 that includes a summary of the reliability of the drilling operation (including data related to stalling, rotor/stator fit and estimates of reliability). The GUI screen 400 includes a graphic 406 that includes warnings of problems related to the drilling operation/simulation, causes of such problems and corrections of such problems.

Figure 5:
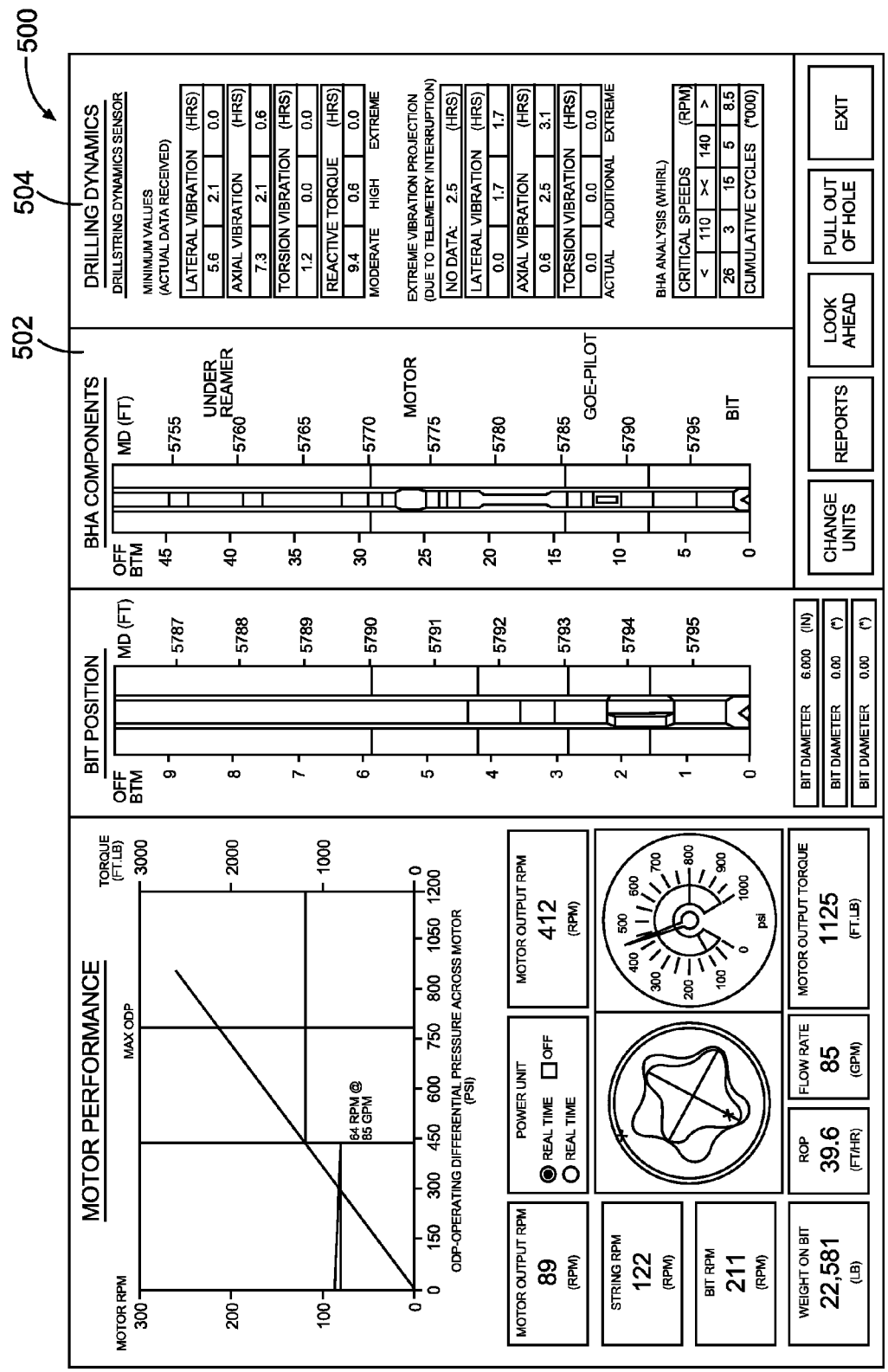
FIG. 5 illustrates a GUI screen that allows for controlling and monitoring of a directional drilling operation/simulation, according to some other embodiments of the invention.

FIG. 5 illustrates a graphical user interface (GUI) screen that allows for controlling and monitoring of a directional drilling operation/simulation, according to some other embodiments of the invention. A GUI screen 500 has some of the same graphics as the GUI screens 300 and 400. In addition, the GUI screen 500 includes some additional graphics.

The GUI screen 500 includes a graphic 502 that illustrates the positions of the different BHA components downhole. The BHA components illustrated include an under reamer, the downhole drilling motor and a rotary steerable tool. The graphic 502 illustrates the distance from the surface and from the bottom for these different BHA components. The GUI screen 500 also includes a graphic 504 that illustrates drilling dynamics of the drilling operation. The drilling dynamics include numerical outputs that include actual data for lateral vibration, axial vibration, torsional vibration and reactive torque. The drilling dynamics also include numerical outputs that include extreme vibration projection (including lateral, axial and torsional). The drilling dynamics also includes a BHA analysis for whirl, which tracks the speeds and cumulative cycles of the BHA.

Figure 6:
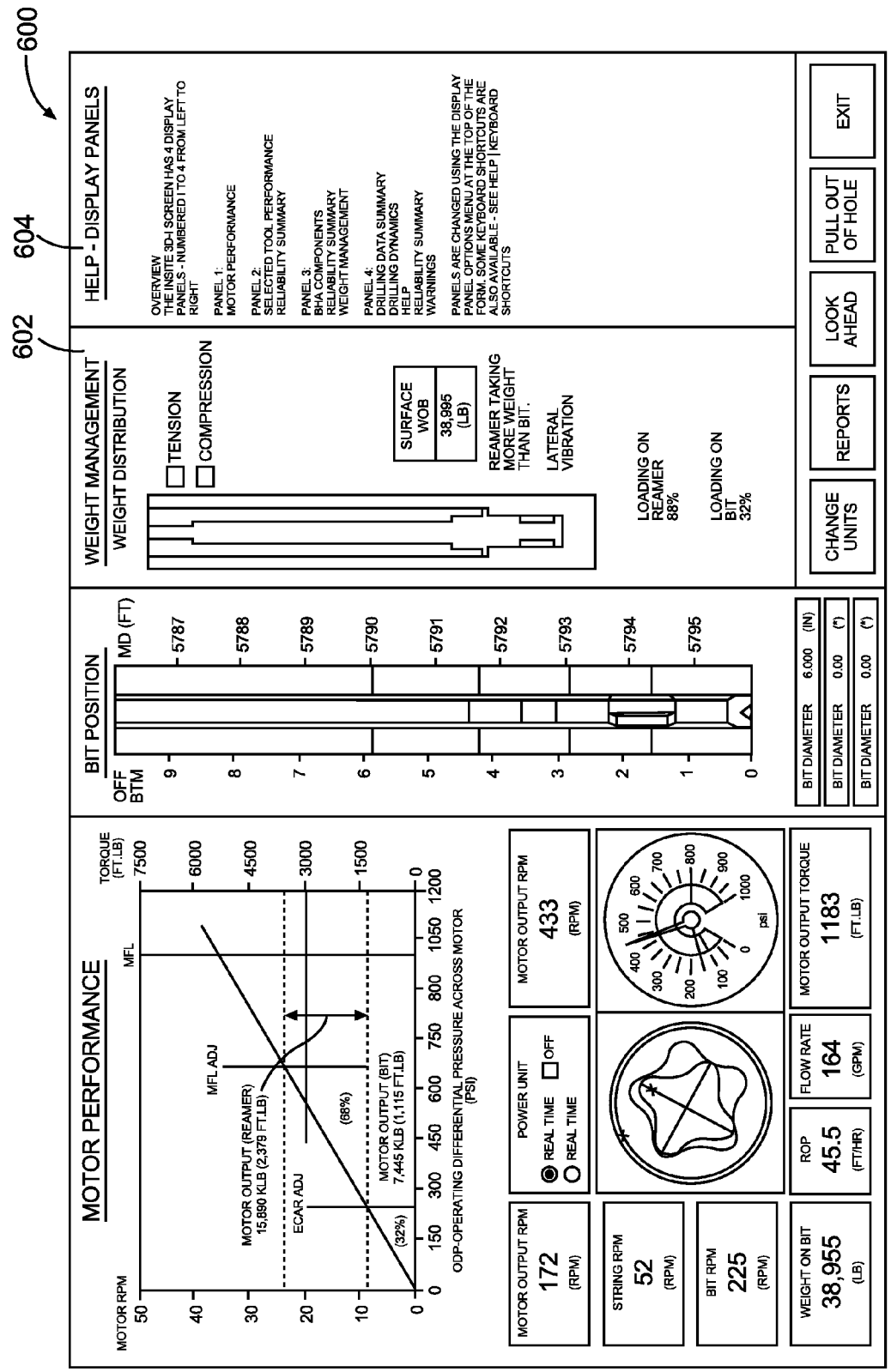
FIG. 6 illustrates a GUI screen that allows for controlling and monitoring of a directional drilling operation/simulation, according to some other embodiments of the invention.

FIG. 6 illustrates a graphical user interface (GUI) screen that allows for controlling and monitoring of a directional drilling operation/simulation, according to some other embodiments of the invention. A GUI screen 600 has some of the same graphics as the GUI screens 300, 400 and 500. In addition, the GUI screen 600 includes some additional graphics.

The GUI screen 600 includes a graphic 602 that illustrates weight management of different parts of the BHA. The graphic 602 includes the total weight on bit and the percentages of the weight on the reamer and the drill bit. The GUI screen 600 also includes a graphic 604 that includes help relative to the other graphics on the GUI screen 600.

Figure 7:
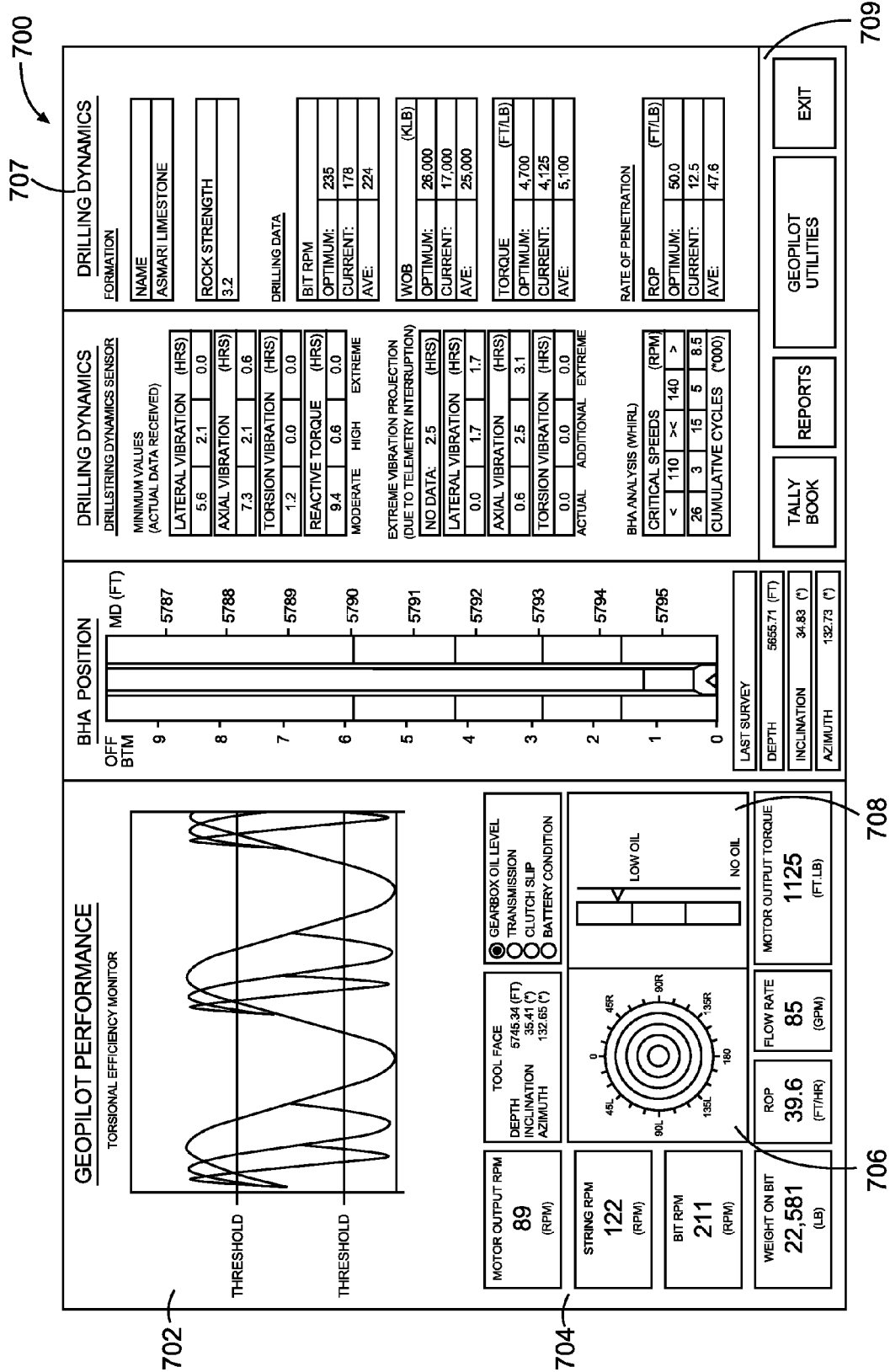
FIG. 7 illustrates a GUI screen that allows for controlling and monitoring of a directional drilling operation/simulation, according to some other embodiments of the invention.

FIG. 7 illustrates a graphical user interface (GUI) screen that allows for controlling and monitoring of a directional drilling operation/simulation, according to some other embodiments of the invention. A GUI screen 700 has some of the same graphics as the GUI screens 300, 400, 500 and 600. In addition, the GUI screen 700 includes some additional graphics.

The GUI screen 700 includes a graph 702 that illustrates the performance of a rotary steerable tool. In particular, the graph 702 monitors the torsional efficiency of the rotary steerable tool relative to a minimum threshold and a maximum threshold. The GUI screen 700 also includes a graphic 704. The graphic 704 includes a graphic 706 that illustrates the current toolface of the bottom hole assembly. The toolface is an azimuthal indication of the direction of the bottom hole drilling assembly with respect to magnetic north. The toolface is referenced to the planned azimuthal well direction at a given depth. The graphic 704 also includes a graphic 708 that illustrates a meter that monitors the gearbox oil level. This meter may be changed to monitor other tool parameters such as the transmission, the clutch slip and the battery condition.

The graphic 704 also includes numerical outputs for a number of attributes of the motor, drill bit and drill string. For example, the graphic 704 includes numerical outputs for the motor output RPMs, the drill string RPMs, the drill bit RPMs, the weight on bit, the rate of penetration, the flow rate and the motor output torque. The graphic 704 also includes numerical outputs for the depth, inclination and azimuth of the well bore.

The GUI screen 700 also includes a graphic 707 that summarizes the drilling efficiency. The graphic 707 includes a description of the formation being cut (including name and rock strength). The graphic 707 also includes numerical output regarding the optimum, current and average for the bit RPM, weight on bit and torque. The graphic 707 also includes a description of the predicate, current and average rate of penetration.

The GUI screen 700 includes a graphic 709 that includes a number of buttons. One button allows for a tallybook application to be opened to allow this data to be input therein. Another button allows for a report to be generated based on the data for this drilling operation. Another button allows for a display of the rotary steerable drilling tool utilities.

Figure 8:
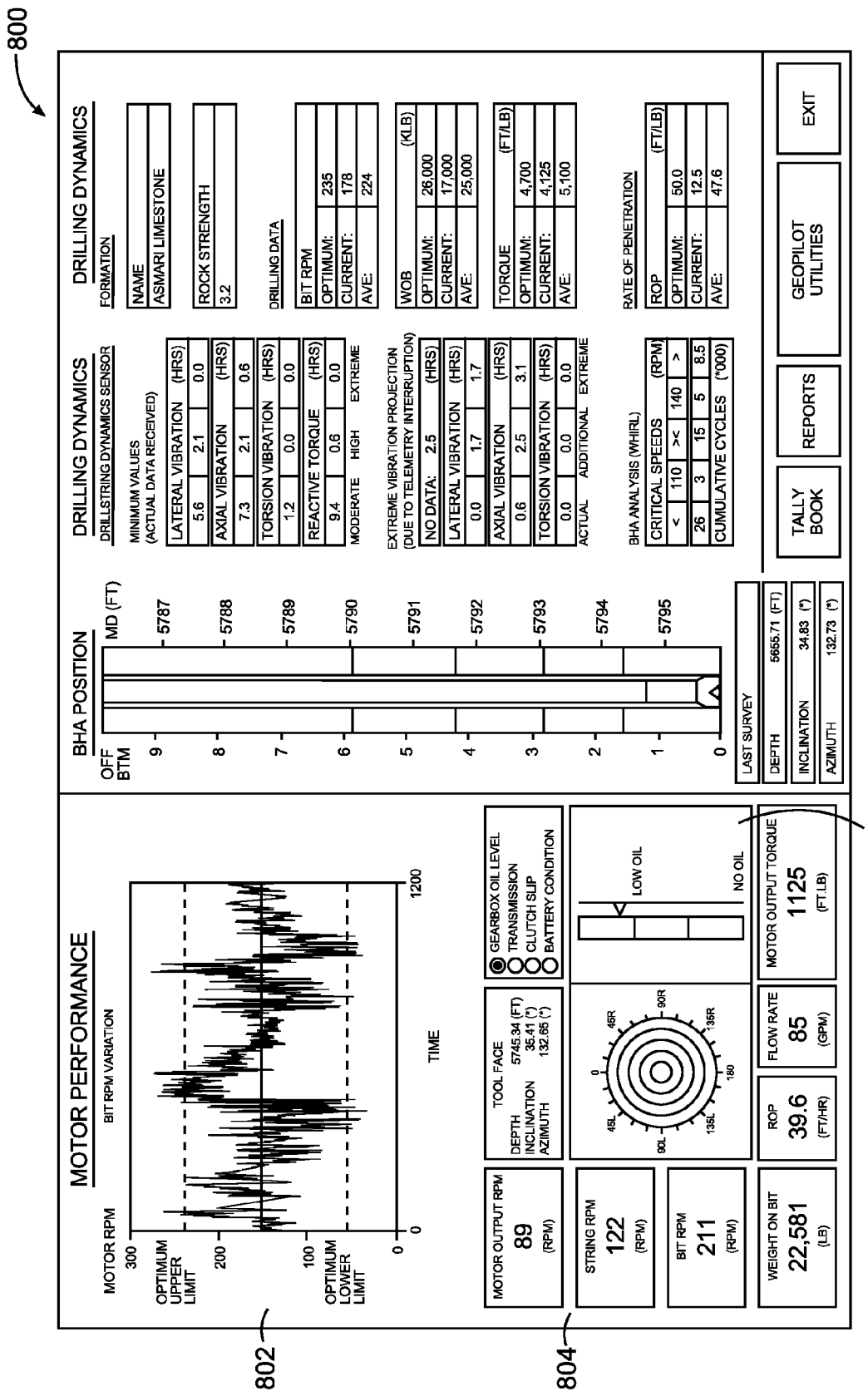
FIG. 8 illustrates a GUI screen that allows for controlling and monitoring of a directional drilling operation/simulation, according to some other embodiments of the invention.

FIG. 8 illustrates a graphical user interface (GUI) screen that allows for controlling and monitoring of a directional drilling operation/simulation, according to some other embodiments of the invention. A GUI screen 800 has some of the same graphics as the GUI screens 300, 400, 500, 600 and 700. In addition, the GUI screen 800 includes some additional graphics.

The GUI screen 800 includes a graph 802 that illustrates the bit RPM variation over time. The graph 802 includes an optimum upper limit and an optimum lower limit for this variation. The graphic 804 is similar to the graphic 704. However, the graphic 708 is replaced with a graphic 806, which includes an illustration of a meter for the current bit RPM. This meter may be changed to monitor the motor RPM, the drill string RPM, the weight on bit, cyclic bending stress (fatigue) loading on drilling assembly components, etc.

FIG. 9 illustrates a report generated for a directional drilling operation/simulation, according to some embodiments of the invention. A report 900 includes graphical and numerical outputs that include data for the drilling (such as depth, rate of penetration, flow rates, etc.). The report 900 also includes attributes for the motor, the drill bit and the mud (including model type, size, etc.). The report 900 includes a motor performance graph similar to graph 302 shown in FIG. 3. The report 900 may be generated at any point during the drilling operation/simulation.

Figure 10:
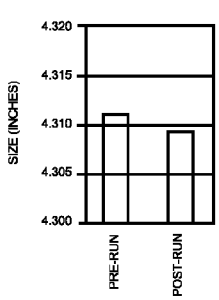

FIGS. 10-11 illustrate another set of reports for a directional drilling operation/simulation, according to some embodiments of the invention. A report 1000 and a report 1100 provide graphical, numerical and text output regarding the operations of the downhole drilling motor. Embodiment may perform numerical logic routines and combine the results with specific written sentences from system memory into written reports. In so doing, embodiments may reduce the burden on the user to first evaluate numerical data and physical occurrences and then to produce grammatically and technically correct written reports. This advanced automated text based reporting facility is referred to within the embodiment as "pseudo text" and "pseudo reporting" and has not been available to the directional drilling process before. This facility is applicable to real-time drilling operations and post-drilling applications analysis.

While a number of different graphics have been shown across different GUI screens, embodiments are not limited to those illustrated. In particular, less or more graphics may be included in a particular GUI screen. The graphics described may be combined in any combination. Moreover, the different GUI screens are applicable to both real time drilling operations and simulations.

Some embodiments provide load monitoring among the downhole components (including the load distribution between the drill bit and reamers). In some embodiments, downhole drilling motors use a positive displacement type helically lobed rotor and stator power units where, for a given flow rate and circulating fluid properties, the operating differential pressure developed across the power unit is directly proportional to the torque produced by the power unit. The relationship between weight on bit (WOB) and differential pressure ($\Delta P$) may be used in relation to assessing the torsional loading and rotation of drill bits—through correlation with the specific performance characteristics (performance graph) for the motor configuration (power unit) being used.

It is becoming increasingly common for operators to run hole opening devices, such as reamers, in conjunction with motors for significant hole enlargement operations of up to +30%. The configuration of these BHAs typically places 30 feet to 120 feet of drill collars, stabilizers and M/LWD equipment between the cutting structure of the bit and the cutting structure of the hole opening device or reamer. In layered formations it is common for the each cutting structure to be in a different rock type causing wide variation in the WOB applied to each cutting structure. The inability to monitor and correct the application of WOB vs. weight on reamer (WOR) has resulted in multiple catastrophic tool failures and significant non productive time (NPT) costs to operators and service providers alike. In some embodiments, the weight and torque applied to the reamer may be approximated and differentiated from that which is applied to the bit. In some embodiments, the weight and torque applied to the reamer in comparison to the bit may be displayed in real time, recorded, etc.

Figure 12:
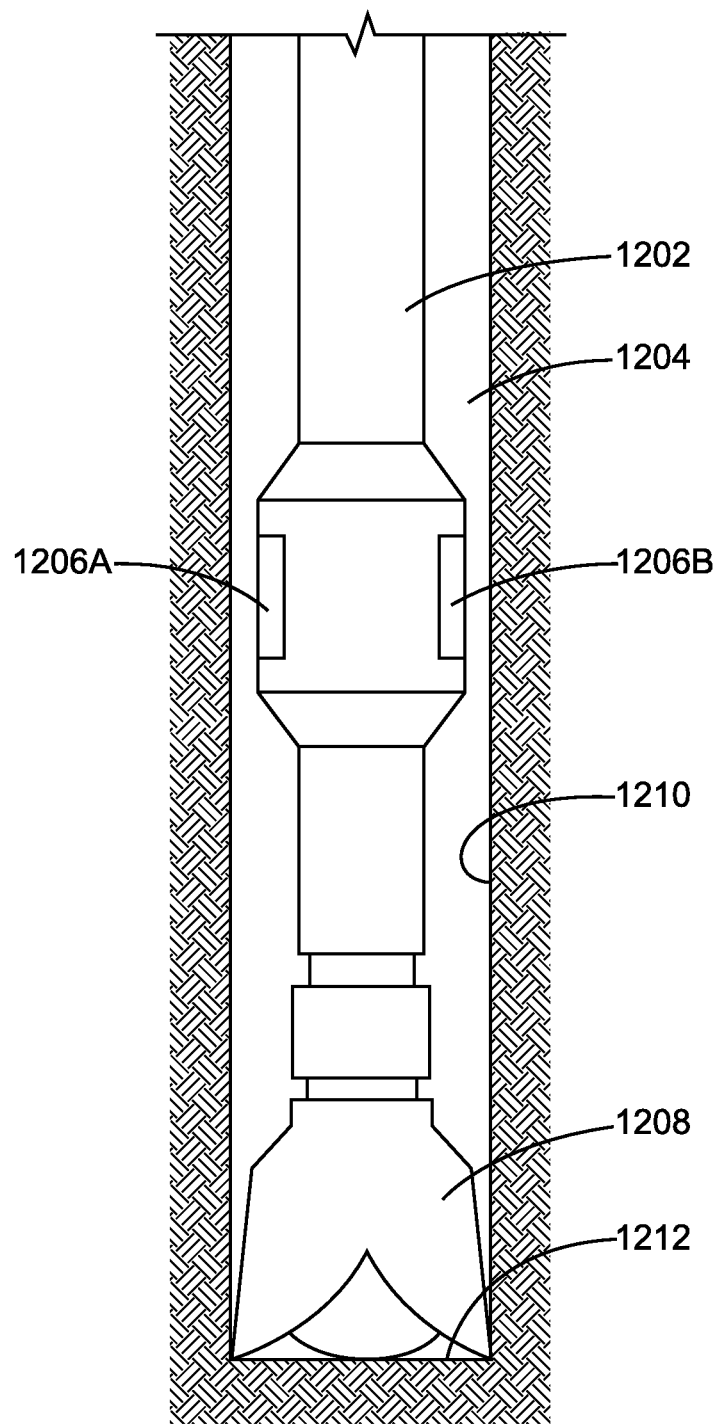
FIG. 12 illustrates a drilling operation wherein the reamer is not engaged and the drill bit is on the bottom, according to some embodiments of the invention.

In some embodiments, the configuration of the drilling operation is set to at least two configurations to establish two different data points. FIG. 12 illustrates a drilling operation wherein the reamer is not engaged and the drill bit is on the bottom, according to some embodiments of the invention. FIG. 12 illustrates a drill string 1202 in a borehole 1204 having sides 1210. The drill string 1202 includes reamers 1206A-1206B which are not extended to engage the sides 1210. A drill bit 1208 at the end of the drill string 1202 is at the bottom 1212 of the borehole 1204. In some embodiments, sensor(s) may determine the torque at the surface. Moreover, sensor(s) may determine the differential pressure while at a normal operating flow rate with the drill bit 1208 on-bottom, at a known WOB, with the reamers 1206A-1206B not engaged, to establish a primary data point. A second data point is then established. In particular, the same parameters (surface torque and differential pressure) may be accessed, while the drill bit 1208 is on bottom drilling, at a different WOB, and the reamers 1206A-1206B are not engaged.

Figure 13:
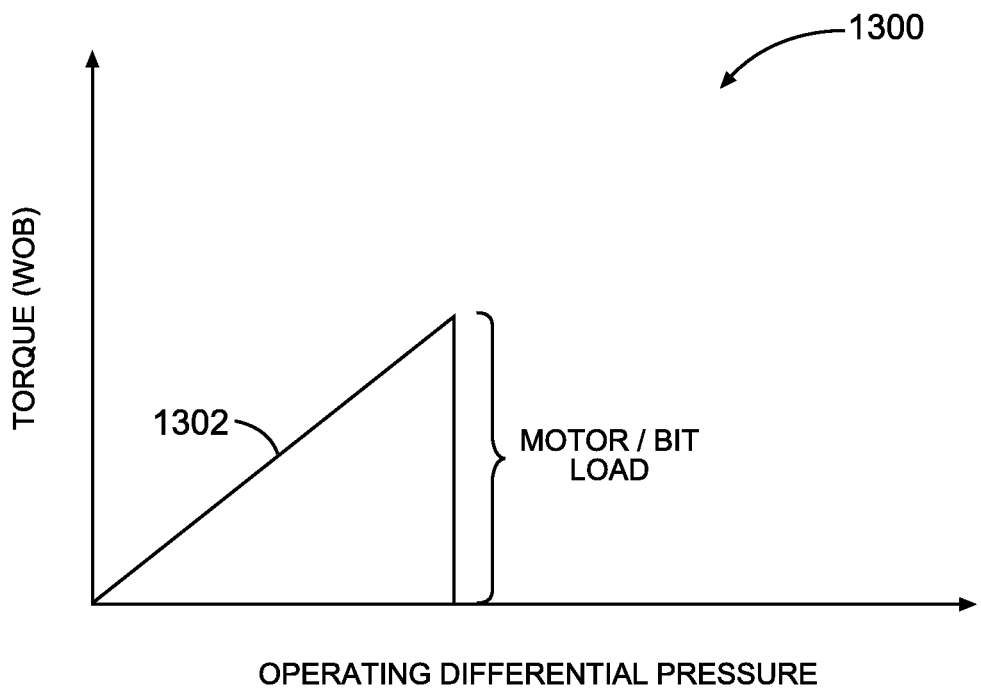
FIGS. 13-14 illustrate graphs of the torque relative to the operating differential pressure for a downhole drilling motor or a rotary steerable tool, according to some embodiments of the invention.
Figure 14:
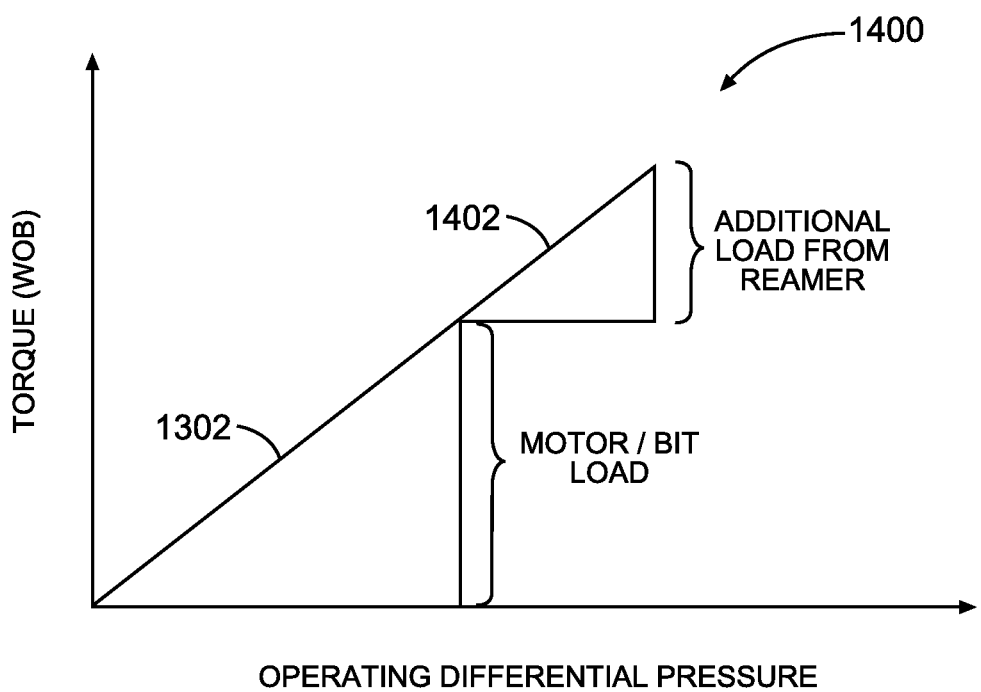

The two data points may be used to calculate the slope of a line. In particular, FIGS. 13-14 illustrate graphs of the torque relative to the operating differential pressure for a downhole drilling motor, according to some embodiments of the invention. In the graphs 1300 and 1400, the difference in differential pressure and the calculated slope are related to previously known functional characteristics of the specific power unit (see the line 1302 in FIGS. 13-14). In some embodiments, any deviation of the calculated slope or extension of the line beyond the calculated intersection on the torque/$\Delta$ curve, is attributed to the hole opener/reamer and hence the torsional loading and rotational motion of the drill bit can be separated from that of other BHA components (see the extension 1402 in FIG. 14).

In some embodiments, this distribution of the loads may be displayed in one of the GUI screens (as described above). These graphical representations may facilitate intervention prior to the onset of stick-slip and lateral vibration. Moreover, this monitoring of the distribution may allow for the approximating of the functionality of additional down hole instrumentation or that of an instrumented motor without providing additional down hole sensors, independent of and without altering existing motor designs.

In some embodiments, the interpretation of motor differential operating pressure can be used to evaluate the forces required to overcome static inertia and friction losses related to other tools which are run below motors, such as rotary steerable tools and adjustable gauge stabilizers. In many high angle and tight hole applications this can be an issue where differential pressure is applied to a drilling motor and the resulting torsional loading is then applied to the tools below the motor. However, rotation of the tools below the motor is not established. Thus, the frictional and tool weight losses are overcome by the applied motor torsion and the tools abruptly begin to rotate. This can cause mechanical loading issues with the tools below the motor in terms of mechanical and electronic components within. Internal motor components can also be adversely affected.

In some applications, the amount of power required to overcome the mechanical loadings caused by the tools below the motor may leave only a limited amount of remaining power with which to undertake the drilling process. The graphical and numerical representations (as described herein) may provide a real-time indication of this problem. Accordingly, directional drilling personnel may adjust drilling operations as required. In some applications tools run below motors may, at times, need to be operated on very low flow rates with small differential pressures in order for such tools to be correctly configured or to perform certain functions.

Embodiments of the graphical and numerical representations may aid in the above scenarios. The more subtle start-up and low level motor operating aspects are often not observable at surface by the directional driller. Embodiments may process relevant data and through these graphical and numerical representations indicate fluctuations in the drill bit rotation and in drilling motor output torque and RPM characteristics. Some embodiments may be applicable to rotary drilling assemblies where there is no drilling motor in the bottom hole drilling assembly.

Figure 15A:
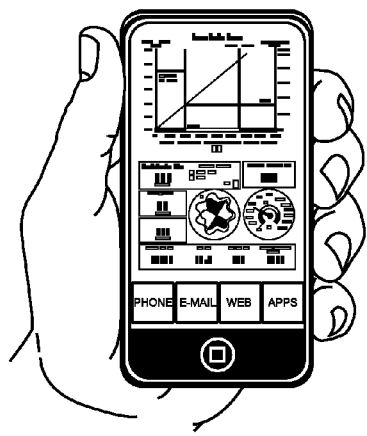
FIGS. 15A-15C show examples of hand mobile communication devices operable to be structured to monitor and control drilling operations and associated functions at drilling sites and simulations thereof, in accordance with various embodiments.
Figure 15B:
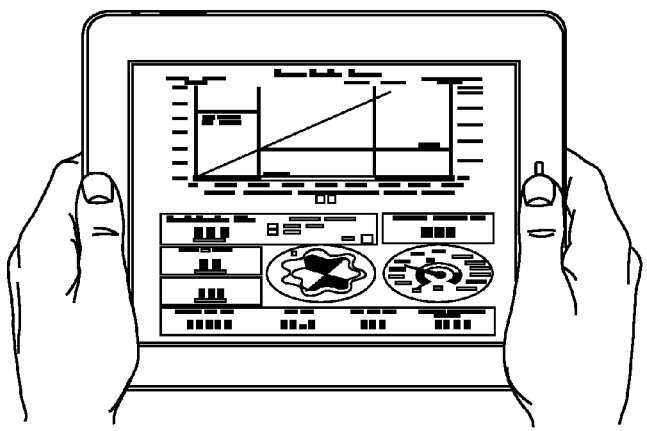
Figure 15C:
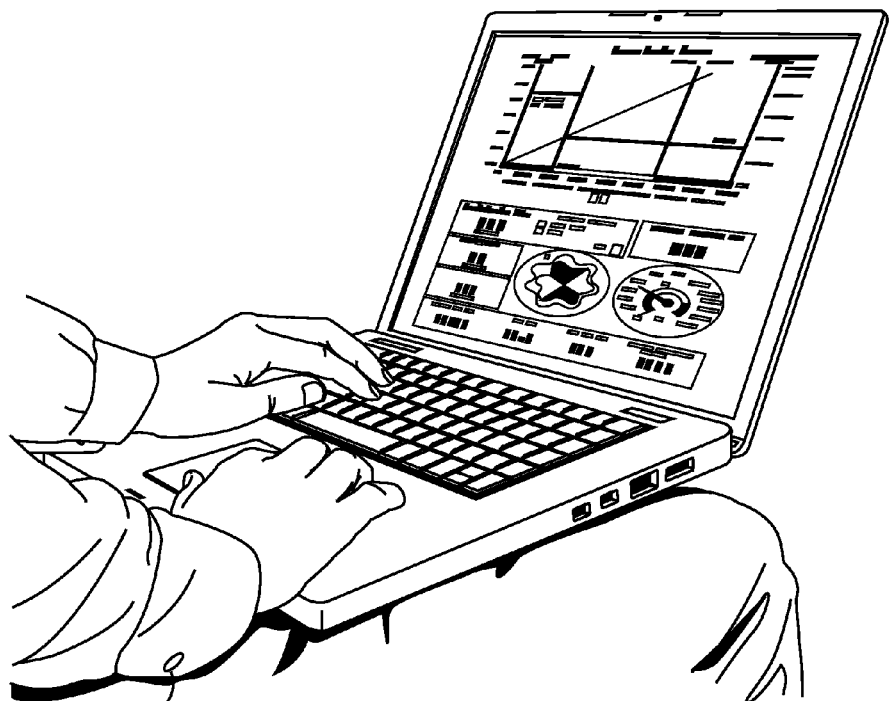

In various embodiments, monitoring and control of directional drilling operations and associated functions and simulations can be conducted in a hand mobile communication device. A hand mobile communication device is defined herein as a device that can communicate wirelessly and is structured such that it is capable of mobility as a hand carried device. Hand mobile communication devices can include, but are not limited to, a smartphone, a tablet, and a laptop computer, each having a graphical user interface. A smartphone, an example of which is illustrated in FIG. 15A, is a mobile phone having an operating system that provides for advanced computing capabilities in the smartphone itself. The advanced computing capabilities include application programming interfaces (APIs) that run non-phone applications on the smartphone and integrate these applications with the operating system of the phone. The computing capabilities provide for data processing and visual display screens that can be executed separate from a communications session. Smartphones can include touchscreens and web browsers. A tablet, an example of which is illustrated in FIG. 15B, is a one-piece mobile computer, typically operated by a user via a touchscreen. The use of a touchscreen and a virtual keyboard allows a tablet to function as a mobile computer similar to a laptop computer, but with reduced hardware components. A laptop computer, an example of which is illustrated in FIG. 15C, is structured in a housing that provides for increased number of hardware components relative to a tablet such as CD/DVD devices embedded in the laptop computer and space for increased data storage. Though laptop computers are mobile computers, they generally are significantly larger in dimensions and weight than a tablet. Components of such hand mobile communication devices can be structured to function similar to components discussed with respect to FIG. 2 to operate to perform procedures and techniques as taught herein with examples associated with FIGS. 1-14. The wireless capabilities of the hand mobile communication devices provide capabilities such that input components such as keyboard ports, CDs, and other components of stationary computers may be eliminated. For instance, a smartphone and a tablet may not include a CD device or similar component for input from an external device, though a laptop computer can include such additional components. In addition to the procedures and techniques discussed above, hand mobile communication device can include APIs and stored instructions for additional analysis of data for a drilling operation at a drill site. The hand mobile communication device can provide for remote monitoring and control of the directional drilling operations at a drill site that is seamless and can be conducted real-time.

A hand mobile communication device may be structured such that it is operable to communicate wirelessly using different wireless transmission modes. For instance, a network interface of the hand mobile communication device can include components to wirelessly communicate over a wireless wide area network (WAN) such as provided by a communications service provider. A network interface of the hand mobile communication device can also include components to wirelessly communicate over a wireless local area network (LAN) such as a Wi-Fi network or by Bluetooth. The hand mobile communication device can use Wi-Fi to couple to a local router to connect to a drilling site via an internet connection. A Bluetooth can also be used to connect to a drilling site via an internet connection. The range of a Bluetooth connection may be less than the Wi-Fi connection. Bluetooth, Wi-Fi, or other short-range wireless instrumentality may also be used to allow the hand mobile communication device to operate with local devices such as, but not limited to, external keyboards, external pointing devices operable with the GUI of the hand mobile communication device, printers, and local external data storage devices.

Figure 16:
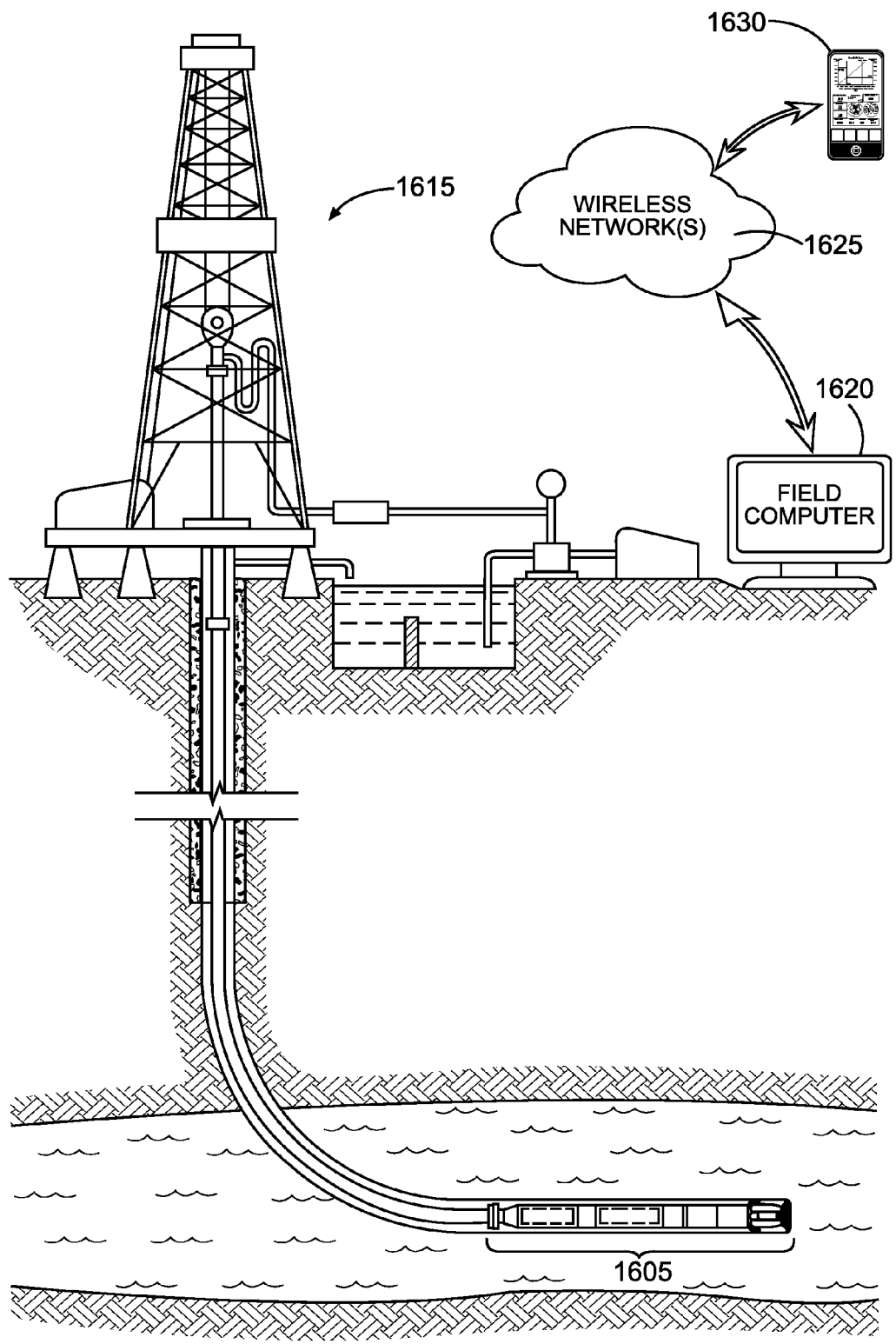
FIG. 16 illustrates an example architecture for monitoring and controlling a drilling operation at a drilling site using a hand mobile communication device, in accordance with various embodiments.

FIG. 16 illustrates an embodiment of an example architecture for monitoring and controlling a drilling operation at a drilling site 1615 using a hand mobile communication device 1630. The drilling operation may be a directional drilling operation of a drilling tool 1605. The drilling operation at the drilling site 1615 may be structured to include components similar to components at the drilling site of FIG. 1. The drilling tool 1605 may include a number of different sensors that collects data and sends the data to the surface. The data can include data regarding the components of the drilling tool 1605, which can include data regarding the interior portions of the components of the drilling tool 1605 and data regarding the portions of the drilling tool 1605 that may directly contact the exterior of the drilling tool 1605. The data can also include data to provide analysis of the formations in which the drilling tool 1605 is operating. Such formation data can be collected from sensors that generate probe signals into the formations and collect signals from the formations in response to the probe signals. The collected signals can include signals from ahead of the directional drilling operation.

The drill tool 1605 can send data to a field computer 1620 located at the drilling site. The field computer 1620 may process some or all of the data from the drill tool 1605 and send the results to other locations, including the hand mobile communication device 1630. The field computer 1620 may forward the data without analyzing the data and/or processing the data to the other locations, including the hand mobile communication device 1630. Alternatively, the data may be analyzed in a processing unit of the drilling tool 105 downhole and a set of results sent to the surface. The set of results may be further processed and/or analyzed at the field computer 1620 or at the other locations, including the hand mobile communication device 1630. If the field computer 1620 functions solely as communication routing device, it may be replaced with a communications router. The field computer 1620 can be structured as a combination of computer and communications router. Communication between the field computer 1620 and the hand mobile communication device 1630 via the wireless network(s) may include other communication medium between the field computer 1620 and wireless networks 1625.

The hand mobile communication device 1630 can receive the data wirelessly from a wireless network 1625 or combination of wireless networks 1625. The combination of wireless networks 1625 can include combinations of one or more wireless WANs and/or one or more wireless LANS. The hand mobile communication device 1630 can display the data in various formats on a GUI screen of the hand mobile communication device 1630. Underlying APIs in the hand mobile communication device 1630 can operate to manipulate the data to further analyze the drilling operation associated with the drilling tool 1605 at the drilling site 1615 and show the results of such further analysis on its GUI. If the data is data that has not been analyzed prior to reception at the hand mobile communication device 1630, underlying APIs in the hand mobile communication device 1630 can operate to analyze the data and display results on the GUI of the hand mobile communication device 1630.

Commands generated in the hand mobile communication device 1630 can be sent from the hand mobile communication device 1630, using the wireless network(s) 1625, back to the drill site 1615 to control the operation of the drilling tool 1605. The commands can be received at the field computer 1620 for further evaluation, for processing in a format to be forwarded to the drilling tool 1605, or for direct forwarding to the drilling tool 1605. The field computer 1620 may be structured as a combination of computer and communications router.

In various embodiments, a process for performing a directional drilling operation at a drilling site can be conducted in coordination with using a hand mobile communications device. Such a process may include receiving data wirelessly in the hand mobile communications device from one or more sensors disposed downhole at the drilling site, wherein at least one of the one or more sensors output data related to a performance attribute of a downhole component. The downhole component can comprise part of a drill string that is used to perform the directional drilling operation. The downhole component may be from a group consisting of a downhole drilling motor and a rotary steerable tool. The performance attribute can be selected from a group consisting of rotations per unit of time of the downhole component, operating differential pressure across the downhole component, and torque output of the downhole component. The data can be sent to the hand mobile communications device from one or more sensors via a field computer at the drilling site or a communications routing device at the drilling site. Such a method can include displaying the data in a numerical representation, a graphical representation, or a combination of graphical representation and numerical representation on a GUI screen of the hand mobile communications device. Additional data associated with the drilling operations can be sent wirelessly to the hand mobile communications device, where information based on the data is displayed on a GUI screen of the hand mobile communications device. Using the GUI screen of the hand mobile communications device, control commands can be generated and sent to the drilling site to control the directional drilling operation. In addition for some functions, commands can be generated from the hand mobile communications device and sent to the drilling site to control the directional drilling operation, automatically without using the GUI. Override control of automatic functions can be set in the hand mobile communications device.

Figure 17:
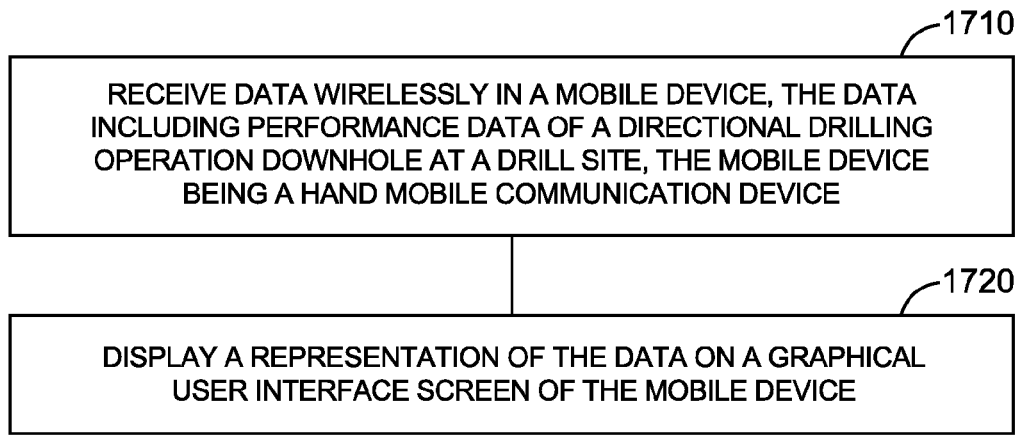
FIG. 17 shows features of an example method to monitor and control a drilling operation using a hand mobile communication device, in accordance with various embodiments.

FIG. 17 shows features of an embodiment of an example method to monitor and control directional drilling operations. Such a method and similar methods can be performed using devices and architectures, as taught herein. At 1710, data is wirelessly received in a mobile device, where the mobile device is a hand mobile communication device. (For ease of discussion, the hand mobile communication device is referred to as the mobile device in the following discussions regarding example features of a method to monitor and control directional drilling operations.) The data can include performance data of a directional drilling operation downhole at a drill site. The data can include data related to a performance attribute of one or more drilling components used in the directional drilling operation and disposed downhole. The one or more drilling components can include a drilling motor and a rotary steerable tool. The performance attribute can include one or more of rotations per unit of time of the one or more drilling components, operating differential pressure across the one or more drilling components, or torque output of the one or more drilling components. The mobile device can be a smartphone. The mobile device can be a tablet. The mobile device can be a laptop computer.

Receiving data in the mobile device can occur in response to a request for information on the drilling operation at a selected site sent to the appropriate system, locally at the drilling site or at a RTO center, or to a drilling tool at the selected drilling site. Digital instructions, data structures, object classes, or various combinations can be used in conjunction with the execution by one or more processors in the mobile device to initiate and conduct monitoring and control of the drilling operations using the mobile device. On a GUI screen of the mobile device, a drilling application can be selected. On the GUI screen a request to select a drilling site can projected. The drilling site can be selected using an input that identifies a selected drilling site by inputting an identification of the drilling site or from a drop-down box on the GUI screen with a set of possible drilling sites. Upon selection of the drilling site, the mobile device can establish communication with the appropriate system or drilling tool at the selected drilling site to send the request for information. The request can be sent as a polling activity in which the request is sent automatically at fixed periods of time to selected drilling sites that have been previously selected.

Receiving data in the mobile device can include receiving the data over a secure communication path with a communication unit at the drilling site. Receiving the data over the secure communication path can include conducting an authentication of the mobile device or user of the mobile device using a third party authentication process. The third party authentication process can use a secure server in which a secure communication is established with the mobile device over a wireless network, while the server may communicate with the communication unit at the drilling site over a land-based network. Use of the land-based network may include use of the Internet.

At 1720, a representation of the data is displayed on the GUI screen of the mobile device. Multiple representations of the data can be displayed individually in response to signals actuated from the interface screen or a user input device of the mobile device. These multiple representations of the data may include selected portions of the data in different selected formats as different pages presented on the GUI screen of the mobile device. The GUI screen can be a touchscreen. A touch screen can be arranged to provide a user input device on the screen. Some hand mobile communication devices can include build-in typewriter-like keys, which can be physically actuated. The keys may be arranged as a qwerty keyboard. Displaying the representation of the data can include displaying in a graphical presentation, a numerical presentation, or a combination of a numerical presentation and a graphical presentation on the graphical user interface screen of the mobile device. Displaying the representation of the data can include displaying the representation of the data on the GUI screen of the mobile device during performance of the directional drilling operation. Displaying the representation of the data on the GUI screen of the mobile device can include displaying a graphical representation of a downhole component disposed as part of a drill string that shows animated movement in an interior of the downhole component. Displaying the representation of the data can include displaying an image of formations with respect to a drilling tool of the directional drilling operation. Displaying the image can include displaying a projected path of the drilling tool in the formations. Displaying the projected path of the drilling tool in the formations can include displaying the projected path as an animation showing the creation and progress of the path. Displaying the representation of the data can include displaying an image of formations represented by characteristics of the formations or relationships of the drilling operation to the formations such as, but not limited to, values of resistivity, values of porosity, values of true vertical direction (TVD) of the drilling, and other values of parameters of the formations and/or drilling operation.

The data to be displayed can be sent wirelessly to the mobile device, where the data is stored on the mobile device. This data can be modified on the mobile device and used to generate additional information on the mobile device to analyze the data relative to the drilling operation, including drilling tool properties and functions, properties of the formations, and relationships of the drilling tool to the formations. The processed data can be displayed in various representations on the GUI of the mobile device. Alternatively, each representation can be sent from a computer at the drilling site, a RTO center, or other sources on an individual basis in a data streaming manner to the mobile device. Interactive commands can be generated using the GUI of the mobile device and sent to the computer that provides the data, where analysis and data modification is conducted on the computer with the results sent back to the mobile device according to a representation format for the results.

A method to monitor and control directional drilling operations can also include transmitting, based on the data sent to the hand mobile communication device, control commands from the hand mobile communication device to a control unit associated with the directional drilling operation at the drill site to control one or more drilling tasks of the directional drilling operation based on the control commands. A method to monitor and control directional drilling operations can also include conducting, in the hand mobile communication device, simulations of the directional drilling operation downhole at the drill site. These simulations can be used to analyze and direct further tasks for the drilling operation. Conducting the simulations in the hand mobile communication device can include conducting the simulations as a training tool, which may allow the use of actual data for training purposes. A method to monitor and control directional drilling operations can also include transmitting commands from the mobile device to a drilling tool of the directional drilling operation to modify operation of the drilling tool or collect additional data. A method to monitor and control directional drilling operations can also include performing the directional drilling operation and directing the directional drilling operation from the mobile device.

Figure 18:
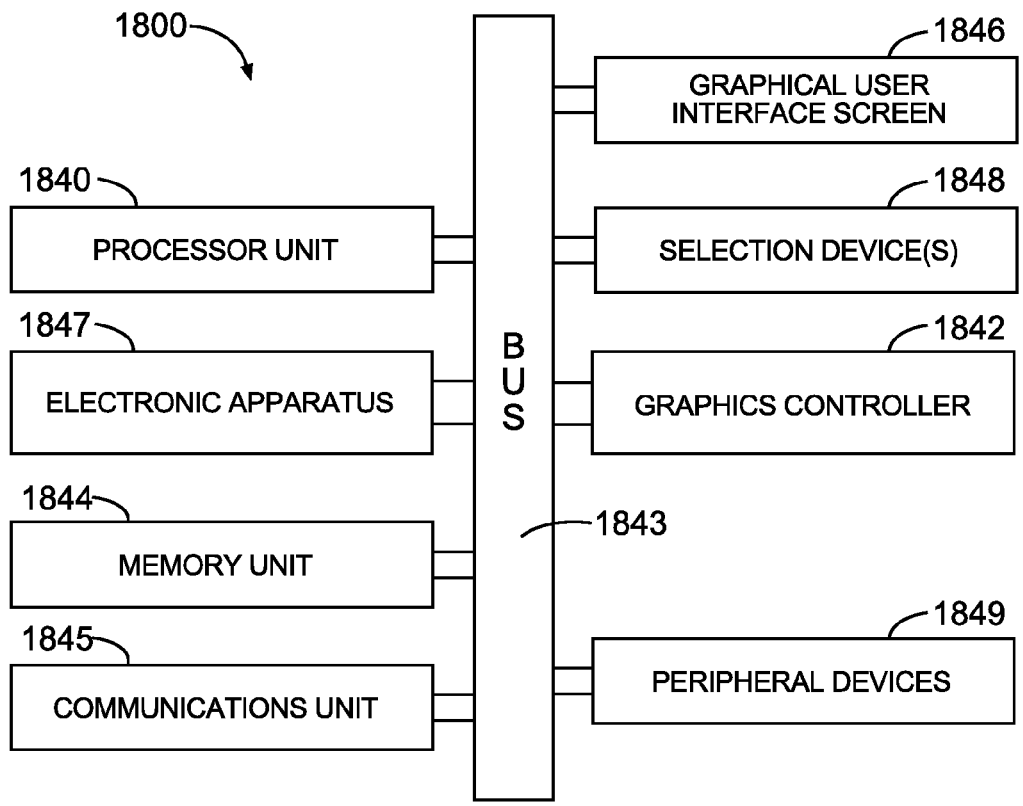
FIG. 18 shows example components of a hand mobile communication device operable to monitor and control drilling operations, in accordance with various embodiments.

FIG. 18 shows example components of a hand mobile communication device 1800 operable to monitor and control drilling operations at a drilling site. The hand mobile communication device 1800 can include a processor unit 1840 having one or more processors and a memory unit 1844 operatively coupled to the processor unit 1840, the memory unit 1844 having instructions stored thereon, which when executed by the processor unit 1840, causes the hand mobile communication device 1800 to perform operations to monitor, to control, or to monitor and control a directional drilling operation downhole at a drill site. The hand mobile communication device 1800 has a wireless communications unit operable to receive signals providing data, the data including performance data of the directional drilling operation downhole at the drill site, and operable to transmit signals over a wireless network. The wireless communications unit can be included in a communications unit 1845 that can be structured with a number of different types of network interfaces or structured for wireless communication only. The hand mobile communication device 1800 has a GUI screen 1846 operable to display a representation of the data received. The hand mobile communication device 1800 has a housing containing the processor unit 1840, the graphical user interface screen 1846, the memory unit 1844, and the communications unit 1845 having the wireless communications unit, the housing being a structure capable of being hand carried.

The hand mobile communication device 1800 may include a graphics controller 1842 to operate the GUI screen 1846. The hand mobile communication device 1800 may include selection devices 1848 to operate in conjunction with the GUI screen 1846, where such selection devices 1848 can include, but are not limited to, instrumentality to operate the GUI screen 1846 as a touchscreen, instrumentality to operate the GUI screen 1846 with external devices including, but not limited to, a computer mouse and keyboard. The hand mobile communication device 1800 includes peripheral devices 1849, which can include circuits that may operate in conjunction with the processor unit 1840, the memory unit 1844, the communications unit 1845, the GUI screen 1846, the graphics controller 1842, or permutations of these components to monitor, control, or monitor and control drilling operations at drilling sites. The hand mobile communication device 1800 includes electronic apparatus 1847, which can be used in conjunction with the processor unit 1840 to perform tasks associated with the hand mobile communication device 1800, where the tasks are in addition to tasks to monitor, control, or monitor and control drilling operations at drilling sites.

The hand mobile communication device 1800 can also include a bus 1843, where the bus 1843 provides electrical conductivity among the hand mobile communication device 1800. The bus 1843 can include an address bus, a data bus, and a control bus, each independently configured. The bus 1843 can also use common conductive lines for providing one or more of address, data, or control, the use of which can be regulated by the processor unit 1840. The bus 1843 can be configured such that the components of the hand mobile communication device 1800 can be distributed within the housing structured to be hand carried.

The memory unit 1844 can include instructions to send commands to a drilling tool at the drill site to control a directional drilling operation of the drilling tool of the drilling operation. The memory unit 1844 can include instructions to simulate the directional drilling operation downhole at the drill site. The hand mobile communication device 1800 can be a smartphone. The hand mobile communication device 1800 can be a tablet. The hand mobile communication device 1800 can be a laptop computer. Further, the hand mobile communication device 1800 can be structured to monitor, control, or monitor and control drilling operations at drilling sites in a manner similar to or identical to the devices, schemes, and architectures discussed herein.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of embodiments of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

Although specific embodiments have been illustrated and described herein, it will be appreciated by those of ordinary skill in the art that any arrangement that is calculated to achieve the same purpose may be substituted for the specific embodiments shown. Various embodiments use permutations

What is claimed is:

1. A method comprising:
   receiving data wirelessly in a mobile device, the data including performance data of a directional drilling operation downhole at a drill site, the mobile device being a hand mobile communication device; and
   displaying a representation of the data on a graphical user interface screen of the mobile device including displaying a graphical representation of a downhole component disposed as part of a drill string that shows animated movement in an interior of the downhole component.

2. The method of claim 1, wherein the method includes transmitting, based on the data, control commands from the mobile device to a control unit associated with the directional drilling operation at the drill site to control one or more drilling tasks of the directional drilling operation based on the control commands.

3. The method of claim 1, wherein the method includes displaying multiple representations of the data individually in response to signals actuated from the interface screen or a user input device of the mobile device.

4. The method of claim 1, wherein displaying the representation of the data includes displaying in a graphical presentation, a numerical presentation, or a combination of a numerical presentation and a graphical presentation on the graphical user interface screen of the mobile device.

5. The method of claim 1, wherein displaying the representation of the data includes displaying the representation of the data on the graphical user interface screen of the mobile device during performance of the directional drilling operation.

6. The method of claim 1, wherein displaying the representation of the data includes displaying an image of formations with respect to a drilling tool of the directional drilling operation.

7. The method of claim 6, wherein displaying the image includes displaying a projected path of the drilling tool in the formations.

8. The method of claim 6, wherein displaying the projected path of the drilling tool in the formations includes displaying the projected path as an animation showing the creation of the path.

9. The method of claim 1, wherein the mobile device is a smartphone.

10. The method of claim 1, wherein the mobile device is a tablet.

11. The method of claim 1, wherein the mobile device is a laptop computer.

12. The method of claim 1, wherein the method includes conducting, in the mobile device, simulations of the directional drilling operation downhole at the drill site.

13. The method of claim 12, wherein conducting, in the mobile device, the simulations includes conducting the simulations as a training tool.

14. The method of claim 13, wherein the method includes transmitting commands from the mobile device to a drilling tool of the directional drilling operation to modify operation of the drilling tool or collect additional data.

15. The method of claim 1, wherein receiving data wirelessly in the mobile device includes receiving the data over a secure communication path with a communication unit at the drilling site.

16. The method of claim 15, wherein receiving the data over the secure communication path includes conducting an authentication of the mobile device or user of the mobile device using a third party authentication process.

17. The method of claim 1, wherein the data includes data related to a performance attribute of one or more drilling components used in the directional drilling operation and disposed downhole.

18. The method of claim 17, wherein the one or more drilling components includes a drilling motor and a rotary steerable tool.

19. The method of claim 17, wherein the performance attribute includes one or more of rotations per unit of time of the one or more drilling components, operating differential pressure across the one or more drilling components, or torque output of the one or more drilling components.

20. The method of claim 1, wherein the method includes performing the directional drilling operation and directing the directional drilling operation from the mobile device.

21. A machine-readable device including instructions stored thereon, which when executed by a processor, causes a mobile device to perform operations comprising operations to:
   receive data wirelessly in the mobile device, the data including performance data of a directional drilling operation downhole at a drill site, the mobile device being a hand mobile communication device;
   display a representation of the data on a graphical user interface screen of the mobile device; and
   display a graphical representation of a downhole component disposed as part of a drill string that shows animated movement in an interior of the downhole component.

22. The machine-readable device of claim 21, wherein the instructions includes instructions to transmit, based on the data, control commands from the mobile device to a control unit associated with the directional drilling operation at the drill site to control one or more drilling tasks of the directional drilling operation based on the control commands.

23. The machine-readable device of claim 21, wherein the instructions include instructions to display multiple representations of the data individually in response to signals actuated from the interface screen or a user input device of the mobile device.

24. The machine-readable device of claim 21, wherein displaying the representation of the data includes displaying in a graphical presentation, a numerical presentation, or a combination of a numerical presentation and a graphical presentation on the graphical user interface screen of the mobile device.

25. The machine-readable device of claim 21, wherein displaying the representation of the data includes displaying the representation of the data on the graphical user interface screen of the mobile device during performance of the directional drilling operation.

26. The machine-readable device of claim 21, displaying the representation of the data includes displaying an image of formations with respect to a drilling tool of the directional drilling operation and displaying a projected path of the drilling tool in the formations.

27. The machine-readable device of claim 21, wherein the mobile device is a smartphone, a tablet, or a laptop computer.

28. The machine-readable device of claim 21, wherein the instructions include instructions to conduct, in the mobile device, simulations of the directional drilling operation downhole at the drill site.

29. The machine-readable device of claim 21, wherein the instructions include instructions to transmit commands from the mobile device to a drilling tool of the directional drilling operation to modify operation of the drilling tool or collect additional data.

30. The machine-readable device of claim 21, wherein the data includes data related to a performance attribute of one or more drilling components used in the directional drilling operation and disposed downhole.

31. The machine-readable device of claim 30, wherein the one or more drilling components includes a drilling motor and a rotary steerable tool.

32. The machine-readable device of claim 30, wherein the performance attribute includes one or more of rotations per unit of time of the one or more drilling components, operating differential pressure across the one or more drilling components, or torque output of the one or more drilling components.

33. The machine-readable device of claim 21, wherein the instructions include instructions to direct the directional drilling operation from the mobile device.

34. A mobile device comprising:
a processor unit having one or more processors;
a memory unit operatively coupled to the processor unit, the memory unit having instructions stored thereon, which when executed by the processor unit, causes the mobile device to perform operations to monitor, to control, or to monitor and control a directional drilling operation downhole at a drill site;
a wireless communications unit operable to receive signals wirelessly providing data, the data including performance data of the directional drilling operation downhole at the drill site, and operable to transmit signals over a wireless network;
a graphical user interface screen operable to display a representation of the data and to display a graphical representation of a downhole component disposed as part of a drill string that shows animated movement in an interior of the downhole component; and
a housing containing the processor unit, the graphical user interface screen, the memory unit, and the wireless communications unit, the housing being a structure capable of being hand carried.

35. The mobile device of claim 34, wherein the mobile device is a smartphone.

36. The mobile device of claim 34, wherein the mobile device is a tablet.

37. The mobile device of claim 34, wherein the mobile device is a laptop computer.

38. The mobile device of claim 34, wherein instructions include instructions to simulate the directional drilling operation downhole at the drill site.

39. The mobile device of claim 34, wherein instructions include instructions to send commands to a drilling tool at the drill site to control a drilling operation of the drilling tool.

* * * * *